(12) United States Patent
Speece et al.

(10) Patent No.: US 11,904,341 B2
(45) Date of Patent: Feb. 20, 2024

(54) OIL DISPENSING SPRAY NOZZLE

(71) Applicant: Compass Systems & Sales, LLC, Barberton, OH (US)

(72) Inventors: Roger Speece, Kirtland, OH (US); Jennifer Swenson, Yorktown, IN (US); Aaron Hall, Alexandria, IN (US)

(73) Assignee: COMPASS SYSTEMS & SALES, LLC, Barberton, OH (US)

( * ) Notice: Subject to any disclaimer, the term of this patent is extended or adjusted under 35 U.S.C. 154(b) by 0 days.

(21) Appl. No.: 17/932,480

(22) Filed: Sep. 15, 2022

(65) Prior Publication Data

US 2023/0107855 A1  Apr. 6, 2023

Related U.S. Application Data

(60) Provisional application No. 63/252,262, filed on Oct. 5, 2021.

(51) Int. Cl.
| | |
|---|---|
| *F16N 5/02* | (2006.01) |
| *B05B 5/025* | (2006.01) |
| *B05B 5/00* | (2006.01) |
| *B21D 37/18* | (2006.01) |
| *B05B 5/043* | (2006.01) |
| *B05B 5/08* | (2006.01) |
| *B05B 5/10* | (2006.01) |
| *B05D 1/04* | (2006.01) |
| *B21D 37/08* | (2006.01) |

(52) U.S. Cl.
CPC .............. *B05B 5/005* (2013.01); *B05B 5/025* (2013.01); *B05B 5/043* (2013.01); *B05B 5/082* (2013.01); *B05B 5/10* (2013.01); *B05D 1/04* (2013.01); *B21D 37/08* (2013.01); *B21D 37/18* (2013.01); *F16N 5/02* (2013.01)

(58) Field of Classification Search
None
See application file for complete search history.

(56) References Cited

U.S. PATENT DOCUMENTS

| | | | |
|---|---|---|---|
| 6,368,409 B1 * | 4/2002 | Borsuk | B05B 5/088 |
| | | | 118/623 |
| 2002/0175281 A1 | 11/2002 | Valaskovic | |
| 2014/0106073 A1 | 4/2014 | Storr | |
| 2016/0184844 A1 | 6/2016 | Di Gioia et al. | |
| 2020/0215562 A1 | 7/2020 | Amato et al. | |

FOREIGN PATENT DOCUMENTS

| | | |
|---|---|---|
| EP | 0562609 A1 | 9/1993 |
| WO | 2020083540 A1 | 4/2020 |

* cited by examiner

*Primary Examiner* — Alexander M Weddle
(74) *Attorney, Agent, or Firm* — Sand, Sebolt & Wernow Co., LPA

(57) ABSTRACT

An electrostatic oiling system for use with single blanks in batch systems having an open spray chamber without the need for a negative vacuum chamber. Further, the provided electrostatic oiling system may utilize induction beams and a charge wall that allows for utilization of a smaller vacuum system. Further, the provided electrostatic oiling system may provide variable blank coverage without the need for metered pumps.

19 Claims, 19 Drawing Sheets

OIL DISPENSING SPRAY NOZZLE

The present disclosure relates generally to the field of electrostatic oiling systems. More particularly, in one example, the present disclosure relates to systems and methods for electrostatic oiling of steel blanks for stamping processes. Specifically, in another example, the present disclosure relates to an electrostatic oiling system for non-continuous oiling of blanks utilizing electrostatic induction bars and vacuum systems for oil manipulation and control.

BACKGROUND

Background Information

Stamping systems, particularly those used with steel blanks, require precise oil application to the blanks for proper stamping operation. It is critical that the amount of oil utilized in such systems is precisely measured and applied as over-oiling can increase costs of production and under-oiling can cause damage to the blanks and/or stamping machinery.

Current blank oiling systems tend to fall into one of two categories; namely, continuous strip coil applications and/or non-continuous single blanks in batch systems. Typically, continuous strip coil applications may utilize electrostatic oiling systems in connection with metered oil spray techniques while non-continuous applications on single blanks in batch systems tend to rely on metered oil spray techniques.

It is common that current oiling systems operate either with no vacuum system (e.g. with continuous strip coil applications) or alternatively tend to use closed or negative vacuum systems (e.g. in blank/batch systems) where the spraying chamber, i.e. the chamber where the oil is applied to the material, is sealed for each application to allow excess oil spray to be vacuumed off. In systems with open spray chambers, an oil mist tends to permeate into the building and while closed or negative vacuum chambers prevent this problem, increased time and cost is added into the system as the chamber must be opened and closed after each blank is oiled.

Additionally, current electrostatic systems tend to operate utilizing extremely high voltage, which can further increase operational costs and maintenance of such systems and which may also pose additional hazards to operators thereof.

SUMMARY

The present disclosure addresses these and other issues by providing an electrostatic oiling system for use with single blanks in batch systems having an open spray chamber without the need for a negative vacuum chamber. Further, the provided electrostatic oiling system may utilize induction beams and a charge wall that allows for utilization of a smaller vacuum system. Further, the provided electrostatic oiling system may provide variable blank coverage without the need for metered pumps.

In one aspect, an exemplary embodiment of the present disclosure may provide an oil system comprising: an upper spray system having at least one upper spray nozzle therein; at least one upper inductor bar within the upper spray system, the at least one upper inductor bar having at least one slot defined through an exterior thereof; a lower spray system having at least one lower spray nozzle therein; at least one lower inductor bar within the lower spray system; a spray zone defined between the upper spray system and lower spray system; and a vacuum system operable to vacuum excess oil from the spray zone through the at least one opening defined through the exterior of the at least one upper inductor bar.

In another aspect, an exemplary embodiment of the present disclosure may provide a method of oiling a blank comprising: moving a blank into a spray zone between an upper spray system having at least one upper inductor bar with a first voltage and a lower spray system having at least one lower inductor bar with a first voltage; increasing the first voltage of the at least one upper inductor bar to a second voltage in response to the blank entering the spray zone; increasing the first voltage of the at least one lower inductor bar to a second voltage in response to the blank entering the spray zone; applying a layer of oil to a top side of the blank with at least one upper spray nozzle of the upper spray system as the blank moves through the spray zone; simultaneously applying a layer of oil to a bottom side of the blank with at least one lower spray nozzle of the lower spray system as the blank moves through the spray zone; moving the blank out of the spray zone; decreasing the second voltage of the at least one upper inductor bar back to the first voltage in response to the blank exiting the spray zone; decreasing the second voltage of the at least one lower inductor bar back to the first voltage in response to the blank exiting the spray zone; and recovering any excess oil from the upper and lower spray nozzles with a vacuum applied through at least one of the at least one upper inductor bar and at least one lower inductor bar.

In another aspect, an exemplary embodiment of the present disclosure may provide a method of spraying oil on a surface comprising: charging a volume of oil to a first voltage; charging at least one spray nozzle to a second voltage; charging at least one inductor bar to a third voltage; directing at least a portion of the volume of oil from the at least one spray nozzle towards a blank of material with the surface to be oiled via the differences between the first, second, and third voltages; moving the blank of material through the oil spray at a predetermined speed to coat the surface with an even layer of oil.

In another aspect, an exemplary embodiment of the present disclosure may provide a method of vacuuming oil comprising: spraying a volume of oil with a first charge into a spray zone defined between an upper spray system and a lower spray system; directing at least a portion of the volume of oil onto a surface of a blank of material moving through the spray zone; applying a second charge to at least one inductor bar having at least one slot defined therethrough wherein the second charge voltage is below the voltage of the first charge applied to the oil; attracting excess oil from the spray zone towards the at least one inductor bar via the difference between the first charge and the second charge; and vacuuming the excess oil from the spray zone through the at least one slot defined through an exterior of the at least one inductor bar.

In another aspect, an exemplary embodiment of the present disclosure may provide an oil vacuum system comprising: at least one inductor bar having an exterior defining a hollow interior and at least one slot defined through the exterior thereof; at least one oil spray nozzle operable to spray oil therefrom, the at least one inductor bar and at least one nozzle further defining an oil spray system; and a vacuum in operable communication with the at least one inductor bar further operable to recover oil sprayed from the at least one nozzle through the at least one slot defined through the exterior of the at least one inductor bar.

In another aspect, an exemplary embodiment of the present disclosure may provide an oil spray nozzle comprising: a first body portion having a leading edge on a side thereof; a first shim having a leading edge corresponding to the leading edge of the first body portion, the leading edge of the first shim having a plurality of alternating teeth and cavities defined therein; a second body portion having a leading edge corresponding to the leading edges of the first body portion and first shim; a second shim having a leading edge corresponding to the leading edges of the first and second body portions and first shim, the second shim further defining an oil cavity therein; an oil aperture defined through the first body portion, first shim, and second body portion and aligned with the oil cavity defined in the second shim; and an oil tube disposed through the oil aperture and oil cavity operable to deliver oil into an interior of the nozzle; wherein the leading edges of the first and second body portions and first and second shims further define an oil edge of the nozzle and wherein the cavities defined in the leading edge of the first shim overlap with the oil cavity defined in the second shim to direct oil from the oil tube to the oil edge of the nozzle.

In another aspect, an exemplary embodiment of the present disclosure may provide an oil spray system comprising: at least one upper nozzle further comprising: a first body portion having a serrated leading edge on a side thereof; a first shim having a leading edge with plurality of alternating teeth and cavities defined therein; a second body portion; a second shim further defining an oil cavity therein; an oil aperture defined through the first body portion, first shim, and second body portion and aligned with the oil cavity defined in the second shim; an oil tube disposed through the oil aperture and oil cavity operable to deliver oil into an interior of the nozzle; an oil vein in operable communication with the oil aperture defined in the second body portion, the oil cavity defined in the second shim, and a valve aperture defined in the second body portion; and a check valve within the valve aperture; at least one lower nozzle further comprising: a first body portion; a first shim having a leading edge with plurality of alternating teeth and cavities defined therein; a second body portion having a serrated leading edge on a side thereof; a second shim further defining an oil cavity therein; an oil aperture defined through the first body portion, first shim, and second body portion and aligned with the oil cavity defined in the second shim; and an oil tube disposed through the oil aperture and oil cavity operable to deliver oil into an interior of the nozzle; a spray zone defined between the at least one upper spray nozzle and the at least one lower spray nozzle; at least one upper inductor bar associated with the at least one upper spray nozzle, the at least one upper inductor bar having at least one slot defined through an exterior thereof; and a vacuum system operable to vacuum excess oil from the spray zone through the at least one opening defined through the exterior of the at least one upper inductor bar.

In another aspect, an exemplary embodiment of the present disclosure may provide a method of spraying oil comprising: delivering oil through an oil tube disposed in an oil aperture defined in a spray nozzle into an interior of the spray nozzle; filling an oil cavity defined in a second shim with oil; transferring oil from the oil cavity into a series of cavities defined in a leading edge of a first shim that at least partially overlap the oil cavity of the second shim; driving the oil out of the cavities along a serrated leading edge of a body of the nozzle via pressurized air; and causing oil to spray from the nozzle to a location remote therefrom.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

With general reference to the figures, an electrostatic oiling system is shown and generally indicated as oil system 10. Oil system 10 is described herein as an electrostatic oiling system for oiling steel blanks using various oil coverages for later stamping operations. Although described as such, it will be understood that many of the systems included in oil system 10 may be utilized for other purposes and/or the entirety of oil system 10 may be modified for use in other similar applications as desired and/or as dictated by the desired implementation. Therefore, it will be understood, that although described with reference to electrostatic oiling, the disclosure of oil system 10 herein may be utilized in other similar applications without limitation. The specific operation and use of oil system 10 will be discussed in further detail below.

Figure 1:
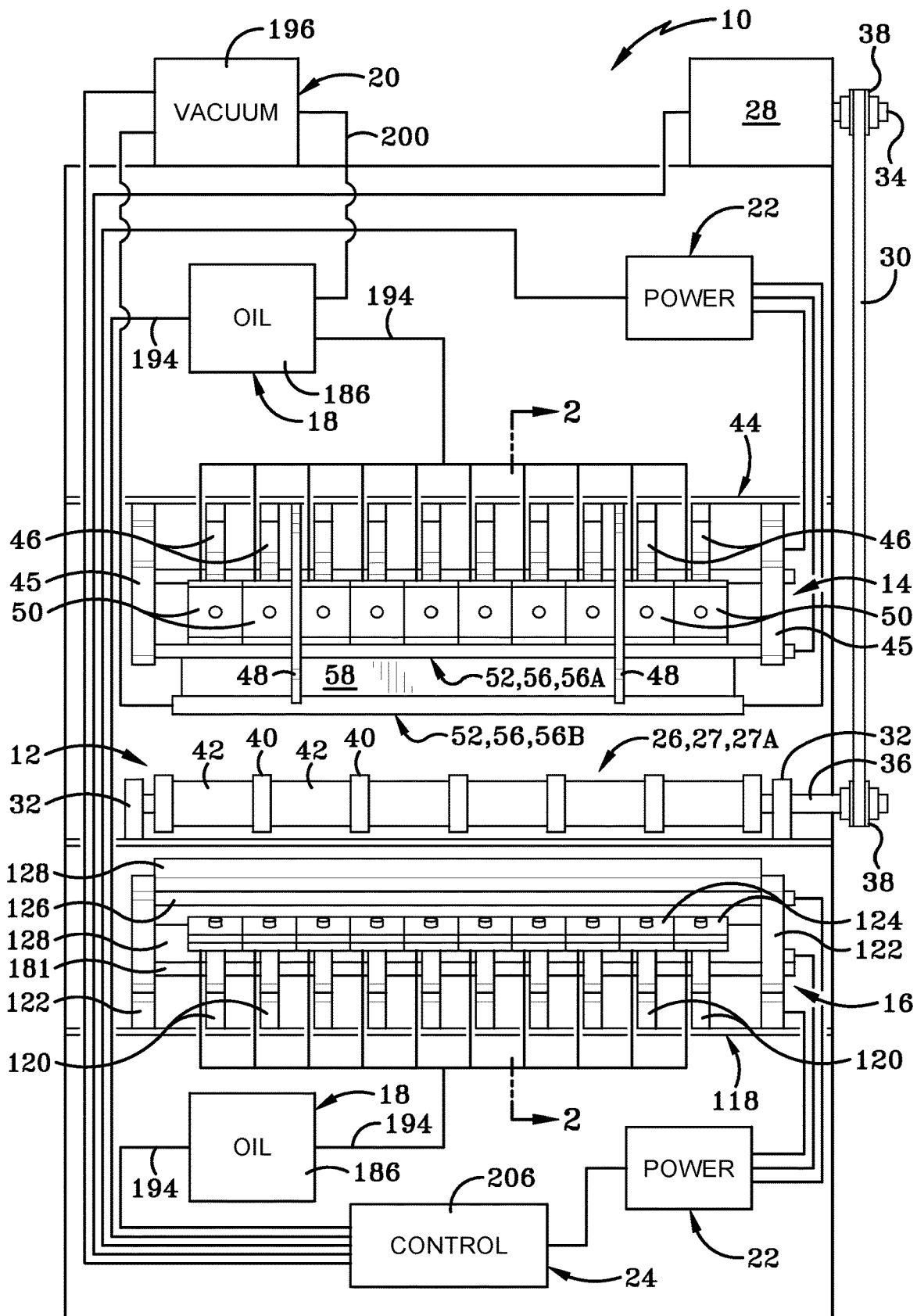
FIG. 1 is a side elevation partial schematic view of an electrostatic oiling system according to one aspect of the present disclosure.
Figure 2:
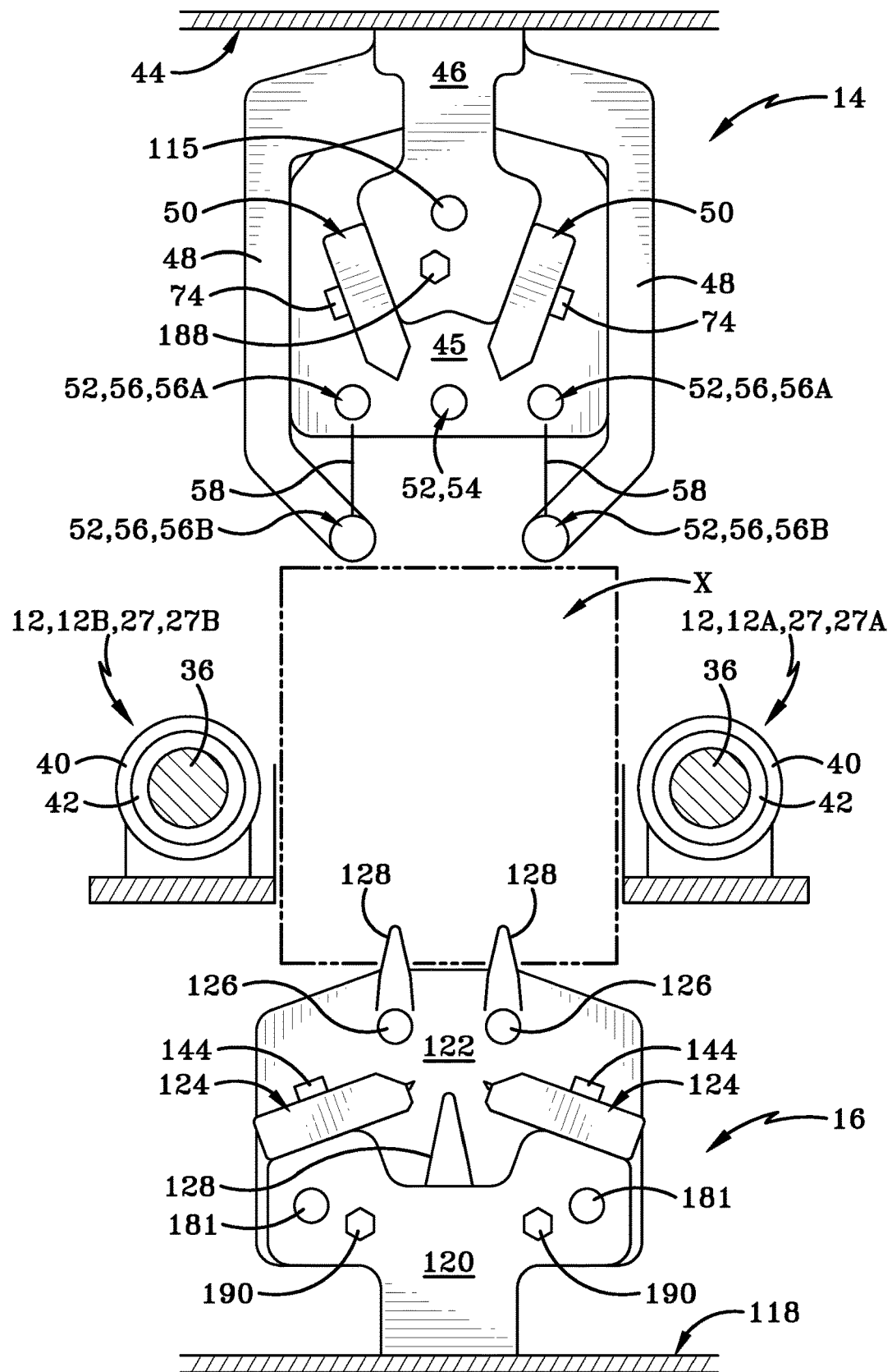
FIG. 2 is a cross sectional view of an electrostatic oiling system looking in the direction of line 2-2 in FIG. 1 according to one aspect of the present disclosure.
Figure 2A:
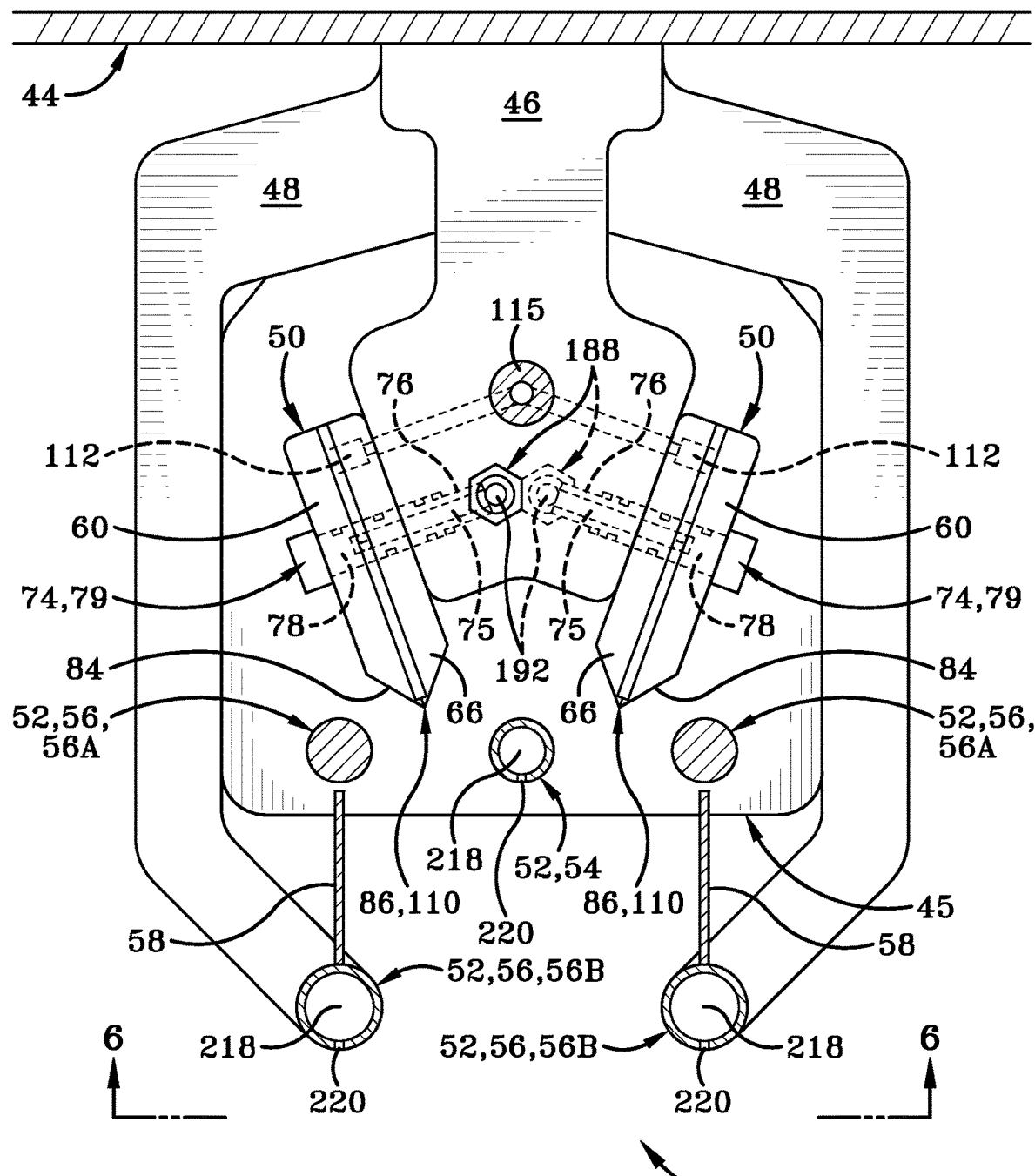
FIG. 2A is a close up cross sectional view of an upper spray system of an electrostatic oiling system according to one aspect of the present disclosure.
Figure 2B:
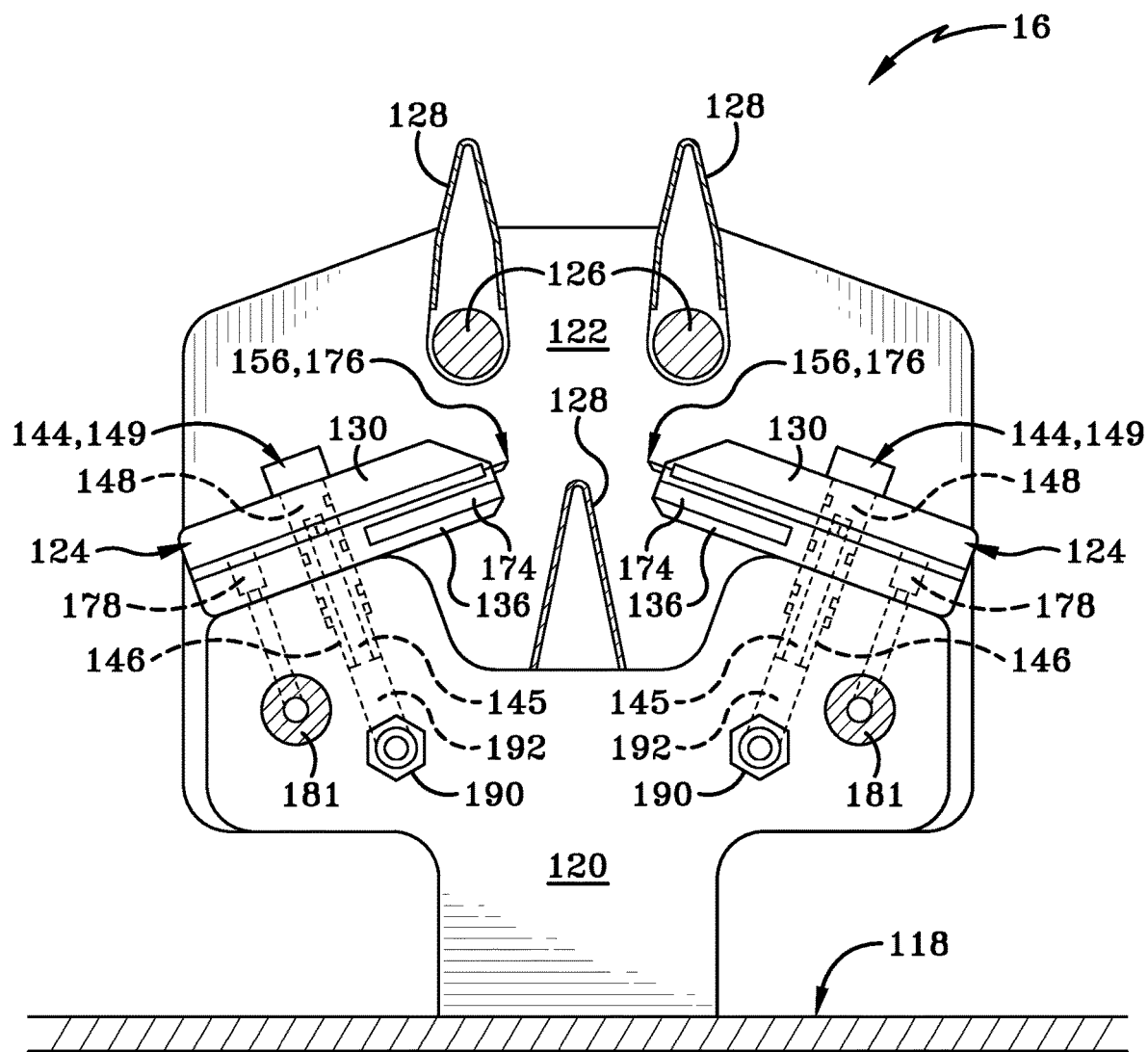
FIG. 2B is a close up cross sectional view of a lower spray system of an electrostatic oiling system according to one aspect of the present disclosure.

With reference to FIGS. 1-2B, an electrostatic oiling system is shown and generally indicated as oil system 10. At its most basic, oil system 10 may include a feed system 12, an upper spray system 14, a lower spray system 16, an oil delivery/recovery system 18, a vacuum system 20, a power system 22, and a control system 24. Each of these systems will be discussed individually below.

Figure 7A:
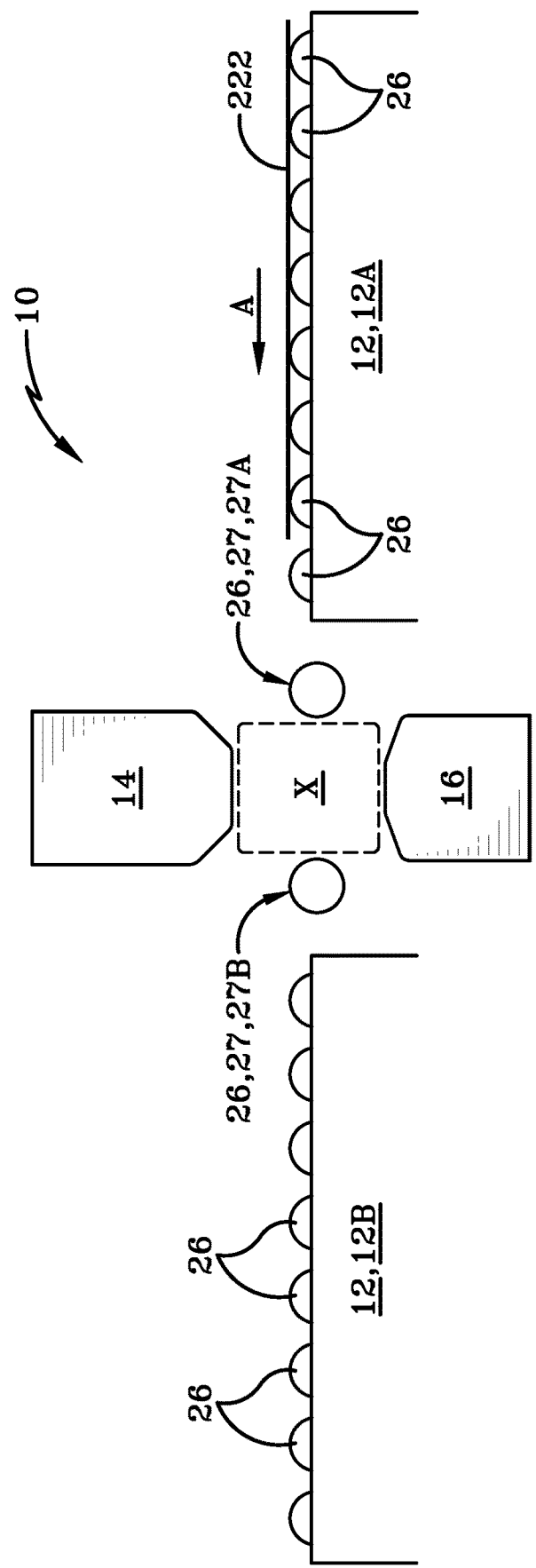
FIG. 7A is a first side elevation operational view of an exemplary electrostatic oiling system according to one aspect of the present disclosure.
Figure 7B:
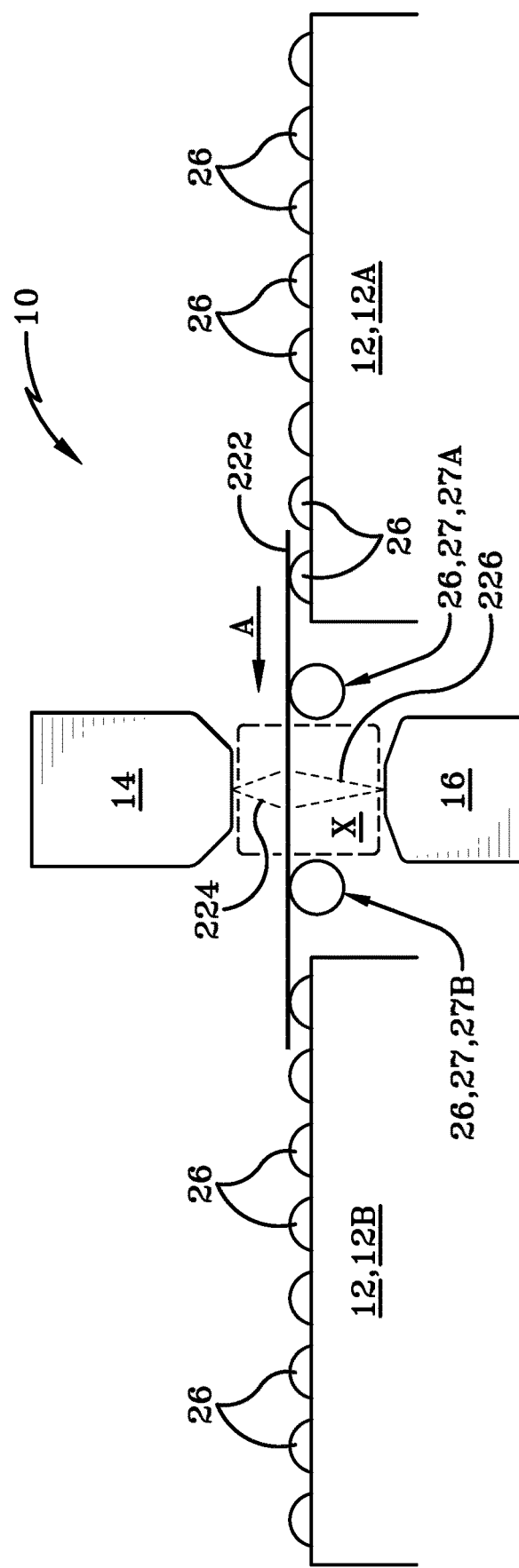
FIG. 7B is a second side elevation operational view of an exemplary electrostatic oiling system according to one aspect of the present disclosure.
Figure 7C:
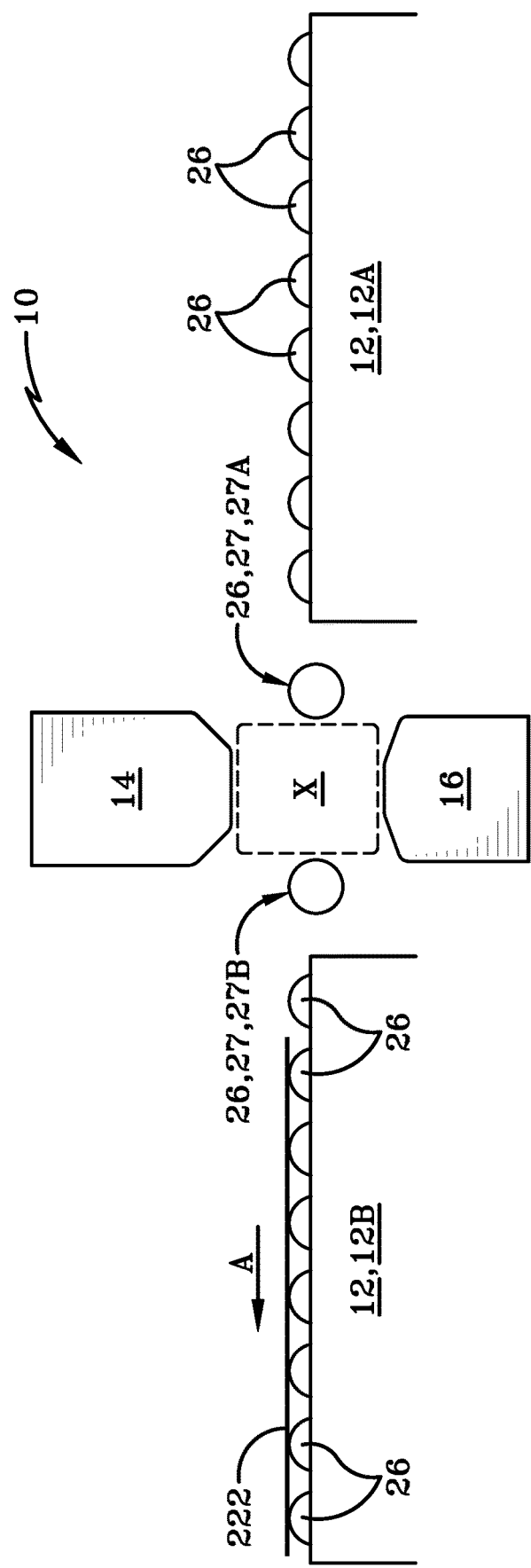
FIG. 7C is a third side elevation operational view of an exemplary electrostatic oiling system according to one aspect of the present disclosure.

With reference to FIG. 1 (and as also seen in FIGS. 7A-7C), feed system 12 may generally have an infeed system indicated as 12A and an outfeed or exit feed system indicated as 12B. Generally speaking, feed system 12 may be utilized to direct a steel blank 222 into and out of oil system 10, as discussed further below. Feed system 12 may further include a plurality of rollers 26, including one or more specialized rollers 27. Feed system 12 may be a driven system in that one or more of rollers 26 and/or specialized rollers 27 may be powered, i.e. mechanically driven, to facilitate movement of blanks 222 through system 10, as described further below. Accordingly, feed system 12 may include a motor 28 and a drive belt 30 which may interact with one or more bearing assemblies 32 and pulleys 38. Belt 30 may extend from a drive axle 34 and a pulley 38 thereon to a roller axle 36 with a second pulley 38 thereon, as dictated by the desired implementation.

Rollers 26 may be any suitable roller configured and operable to engage and move a piece of material such as a blank 222, as described further below. Rollers 26 may generally extend transversely to the direction of travel of the blank 222 to further facilitate the movement of the material, as discussed further below. Rollers 26 may be formed of any suitable material including steel or other metals, polymers, plastics or the like and may include a surface texture to aid in gripping or otherwise moving material through system 10. With the exception of specialized rollers 27 discussed below, feed system 12 and rollers 26 may be any suitable commercially available feed system as dictated by the desired implementation or may alternatively be integrated with oil system 10, as desired.

Specialized rollers 27 may include a first specialized roller 27A and a second specialized roller 27B. The main and/or only difference between specialized rollers 27A and 27B may simply be their placement within oil system 10 with one specialized roller, e.g. 27A, on the intake side of oil system 10 as defined by the side of oil system 10 accepting a blank 222 therein, while the other specialized roller, e.g. 27B, may be on the exit or "out" side of oil system 10, as described further below.

Specialized rollers 27 may be specialized relative to rollers 26 in that they may be controlled or operated separately from rollers 26 to control the speed at which a blank 222 moves through system 10 as blank 222 is being oiled. Further, specialized rollers 27 may have reduced contact points with blank 222 through the use of alternating urethane roller sections 40 and spacers 42. This may reduce the amount of contact between blank 222 and roller 27 to prevent oil from being transferred off of blank 222 and onto rollers 27. Although described as urethane roller sections 40, it will be understood that these roller sections may be made of any suitable material including the previously listed urethane, or of other polymers, or other similar materials, as desired and discussed herein.

Motor 28 may be operable to drive rollers 26 and/or specialized rollers 27 and may be any suitable motor, or may be more than one motor 28 or type of motor, including, but not limited to, electric motors, gas powered motors, servo motors, or the like. According to one aspect, motor 28 may be operationally connected to rollers 26 and specialized rollers 27 to drive both sets of rollers 26, 27 simultaneously, as dictated by the desired implementation. According to another aspect, rollers 26 may have separate motors 28 (not shown) from specialized rollers 27. Although described herein as belt-driven (via belt 30), it will be understood that motor 28 may be operationally connected to rollers 26 and/or 27 through any suitable means including belts, chains, and/or a direct connection, where desired, and may further include any additional components as necessary, including, but not limited to, belt tensioners, alignment wheels, or other similar intermediate components.

With reference to FIGS. 1-2A, upper spray system 14 may include a support frame 44, which may further include at least one header 46 and a series of support arms 48. Upper spray system 14 may further include a plurality of upper spray nozzles 50 and at least one upper inductor bars 52. In implementations with more than one upper inductor bar 52, upper inductor bars 52 may further be arranged with a center inductor bar 54 and one or more outer inductor bars 56. According to one aspect, upper spray system 14 may include a center inductor bar 54 and four outer inductor bars 56 in a boxed or square shaped arrangement including top outer inductor bars 56A and bottom outer inductor bars 56B. According to another aspect, upper spray system 14 may include any suitable number of upper inductor bars 56 in any suitable arrangement, as desired. Upper spray system 14 may further include one or more charge walls 58 which may extend vertically outside of center inductor bar 54 and between top and bottom outer inductor bars 56A and 56B (where equipped), as described further herein. According to another aspect, charge walls 58 may be placed in any suitable position within upper spray system 14.

Support frame 44 may generally be a frame or a portion of the frame of oil system 10 in that it may be an overall supporting structure to support all components of oil system 10, including upper spray system 14. Support frame 44 may further include one or more support plates 45 which may further support or carry at least one of the upper inductor bars 52, as discussed further below.

Support frame 44 may have at least one header 46 extending downward therefrom which may be integrally formed with support frame 44 or may alternatively be connected thereto. According to one aspect, header 46 may generally extend the lateral width of oil system 10 and may further support the upper spray nozzles 50 and related components thereon, as discussed further below. According to another aspect, as shown in the figures, header 46 may be a series of headers with one header 46 for each pair of upper spray nozzles 50, as discussed further below.

Support arms 48 may be spaced along the lateral or transverse width of oil system 10 and may extend downward from support frame 44 and/or from header 46 and may be shaped and configured to support one or more of the upper inductor bars 52, as discussed further below.

Each component of support frame 44, including plates 45, header 46, and/or support arms 48 may be constructed of any suitable material; however, it is contemplated that these components may be constructed from material that is electrically neutral to avoid any electrical effects on the oil within oil system 10 as it is operated, as discussed further below. Alternatively, each of these components may be constructed of any suitable material and may further be coated or otherwise treated to prevent any electrostatic build-up or charge being applied thereto, as discussed further below.

Figure 3:
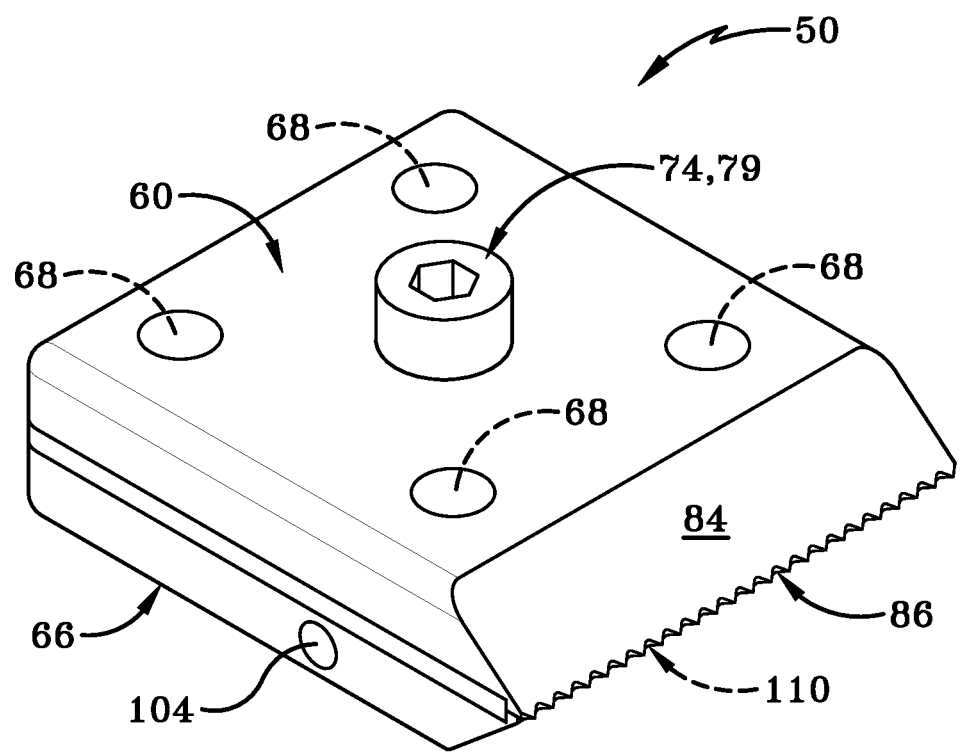
FIG. 3 is a top isometric perspective view of an upper spray nozzle of an electrostatic oiling system according to one aspect of the present disclosure.
Figure 3A:
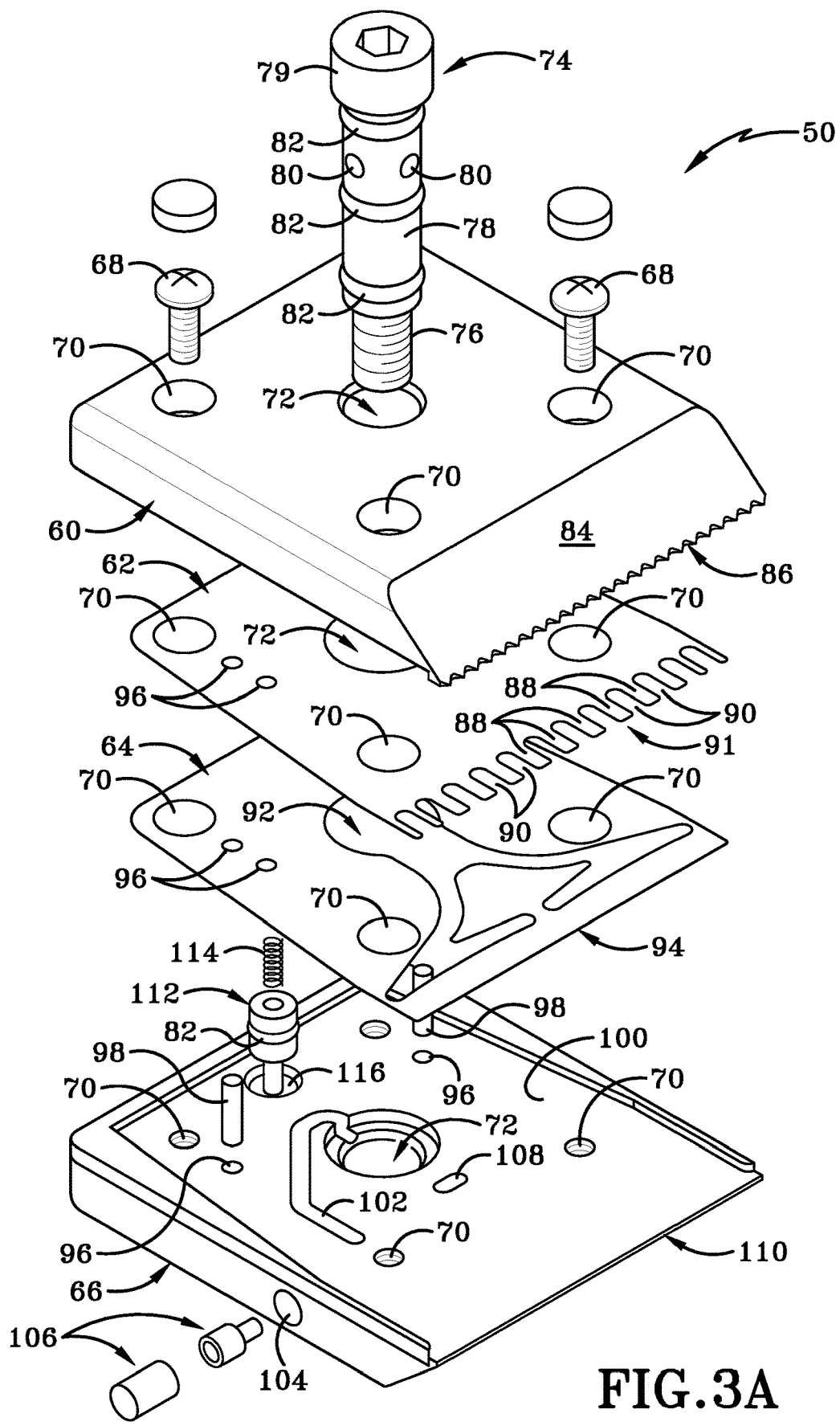
FIG. 3A is a top isometric perspective exploded view of an upper spray nozzle of an electrostatic oiling system according to one aspect of the present disclosure.

With reference to FIGS. 2, 2A, 3, and 3A, but with particular reference to FIG. 3A, upper spray nozzles 50 may have a first body portion 60, a first shim 62, a second shim 64, and a second body portion 66 opposite first body portion 60. Generally speaking, first and second shims 62 and 64 may be sandwiched between first and second body portions 60 and 66 to form a single nozzle (as shown best in FIG. 3). Upper spray nozzle 50 may further include a plurality of fasteners 68 operable to secure the nozzle 50 together as previously mentioned and as described further herein. Fasteners 68 may engage with a series of apertures 70 defined through first body portion 60, first shim 62, and second shim 64, and further extending into second body portion 66.

According to one aspect as shown in FIG. 3A, fasteners 68 may be threaded fasteners while the apertures 70 defined into second body portion 66 may be complementarily threaded and operable to accept fasteners 68 therein. According to another aspect, fasteners 68 may be any suitable fastener including rivets, screws, bolts, or other similar mechanical fasteners. According to yet another aspect, first and second body portions 60 and 66 may be assembled with first and second shims 62 and 64 therein through other suitable means such as adhesives, epoxies, snap connectors, or the like.

Upper spray nozzles 50 may further include an oil port 72 defined therethrough which may allow an oil tube 74 to be positioned within nozzle 50 and operable to deliver oil to the nozzle 50, as described further herein. Oil tube 74 may have a base portion 76 which may be threaded or otherwise operable to secure oil tube 74 within header 46 of upper spray system 14 while simultaneously combining with body portion 78 to secure upper spray nozzle 50 to header 46. As best seen in FIG. 3A, body portion 78 may include a head 79 which may be a standard bolt or fastener head operable to rotate oil tube 74 to provide threadable engagement with header 46, as discussed further below. As shown in FIG. 3A, head 79 may accept an Allen wrench or similar device to facilitate threading; however, any suitable head may be provided, as dictated by the desired implementation. As best seen in FIG. 2A, oil tube 74 may have a generally hollow interior 75 which may allow the passage of oil therethrough, as discussed further below.

Body portion 78 of oil tube 74 may further include one or more oil delivery apertures 80 along with one or more O-rings 82. Oil delivery apertures 80 may be through apertures connecting to the hollow interior 75 of oil tube 74 to allow the passage of oil therethrough, as described further below, while O-rings 82 may seal the body portion 78 within aperture 72 to prevent oil from passing along oil tube 74 and out of nozzles 50 to prevent oil loss and/or other associated issues.

First body portion 60 may generally form an outer portion or "top" portion of nozzles 50 and may include an angled surface 84 with a leading edge 86, which may be serrated as shown in the figures. Serrated edge 86 may be a leading edge in that it may define a front of the first body portion 60 and generally the front of upper spray nozzles 50 (i.e. the side of nozzles 50 oriented towards the spray zone X, as discussed below). Serrated edge 86 may further be an oil edge, i.e. the edge of nozzle 50 and first body portion 60 having oil dispersed therefrom. Accordingly, regardless of its orientation within upper spray system 14 and oil system 10 generally, the upper spray nozzles 50 may therefore be understood to have the "leading" or "front" edge oriented towards or in the direction of the desired oil spray, as discussed further below.

First body portion 60 may generally be constructed of any suitable material including, but not limited to, plastics, polymers, or other similar non-conductive materials. Alternatively, first body portion 60 may be formed of any other suitable material and may be coated or otherwise treated to prevent the conduction of electricity therefrom. According to one aspect, first body portion 60 may be formed of Polyether ether ketone (PEEK) plastic. PEEK plastic may be used due to its excellent mechanical and chemical resistance properties; however, any other suitable material may be utilized as desired.

First shim 62 may likewise include a leading edge 91, i.e. an edge oriented towards or in the direction of the desired oil spray, consisting of a series of alternating teeth 80 and cavities 90. As best seen in FIG. 3A and FIG. 5C, teeth 88 and cavities 90 may vary in size for even disbursement of oil, as discussed further below. Specifically, teeth 88 and/or cavities 90 towards the outer edges of first shim 62 may be narrower than teeth 88 and cavities 90 towards the center thereof, which may generally cause oil interacting therewith to naturally "thin out" towards the edges, preventing leakage and/or seepage of oil out of the sides of nozzles 50. According to another aspect, teeth 88 and cavities 90 may be of uniform size and spacing, as dictated by the desired implementation. First shim 62 may further include apertures 70 and oil port 72 to align with apertures 70 and oil port 72 of first body portion 60.

As with first body portion 60, first shim 62 may be formed of any suitable material including any suitable non-conductive material such as PEEK plastic or the like.

Similarly to first shim 62, second shim 64 may also include a leading edge 94 which may correspond to the leading edge 86 of first body portion 60, again defined as the edge oriented towards the desired spray location, as discussed further below. Second shim 64 may further include apertures 70 to align with similar apertures 70 of first shim 62 and first body portion 60. Second shim 64 may further include an oil cavity 92 which may be a machined cavity defined in second shim 64 for containing a reservoir of oil for the disbursement thereof, as discussed further below. Oil cavity 92 may further align with oil port 72 in first shim 62 and first body portion 60 for passage of oil tube 74 therethrough. As with first body portion 60 and first shim 62, second shim 64 may be formed of any suitable material including, but not limited to, PEEK plastic.

Both first and second shims 62 and 64 may further include at least one alignment aperture 96 on each side thereof which may facilitate proper alignment and positioning of first and second shims 62 and 64 within nozzle 50. Specifically, alignment apertures 96 may correspond to an alignment bar 98 which may sit in corresponding alignment apertures 96 formed in second body portion 66 (discussed below) and/or first body portion 60 to allow proper positioning of all upper spray nozzle 50 components when assembled. As best seen in FIG. 3A, each of first and second shims 62 and 64 may include a plurality of alignment apertures 96 with each aperture defining a specific position. As shown, two alignment apertures 96 per side may be provided to correspond to a forward, i.e. towards leading edges 86, 94 and 110, or a rearward position wherein shims 62 and 64 are placed further back within spray nozzle 50.

Second body portion 66 may include a recessed area 100 defined therein which may be a space provided to contain first and second shims 62 and 64 therein to allow for a flush mating engagement between first and second body portions 60 and 66 of nozzles 50 while containing first and second shims 62 and 64 therein. Second body portion 66 may further include apertures 70 corresponding to apertures 70 in the other components of upper spray nozzle 50; however, the apertures 70 defined in second body portion 66 may be terminal in that they may not be defined through the entire thickness of second body portion 66. These apertures 70 may further differ in that they may include internal threading corresponding to the threaded fasteners 68, as previously mentioned herein. Second body portion 66 may further include an oil port 72 aligning with and corresponding to oil ports 72 in the other upper spray nozzle 50 components.

Second body portion 66 may further include a vein 102 which may be defined as a channel or depression within second body portion 66 and may be in fluid communication with oil port 72 to provide free flow of oil and/or air, as needed, within upper spray nozzle 50. This vein may further provide a mechanism for the removal of excess air and/or movement of excess oil, as described further below. Vein 102 may further communicate with a valve aperture 104 (best seen in FIG. 3A and FIG. 5A) which may further contain a check valve 106 therein, and with valve port 108. As discussed further below, vein 102, valve aperture 104, check valve 106, and valve port 108 may be in fluid communication to provide overflow operation for excess air pressure and/or excess oil pressure within nozzle 50.

Second body portion 66 may further include a leading edge 110 corresponding to leading edges 91 and 94 of first and second shims 62 and 64 and serrated leading edge 86 of first body portion 60. Second body portion 66 may further include an air valve 112 with a valve spring 114 which may be within and interact with an opening or seat 116 defined in second body portion 66, as discussed further below. Air valve 112 may be any suitable air valve 112 including those commercially available.

Upper spray system may further include upper inductor bars 52, including center inductor bar 54 and outer inductor bars 56, and one or more charge walls 58. Each of these components will be discussed in more detail below. Further, these components may be best understood through the operation and function thereof, which will also be discussed in further detail below.

With reference to FIGS. 1, 2, and 2B, lower spray system 16 is shown and will now be described. Lower spray system 16 may include a support frame 118 which may further include one or more headers 120 to support lower spray nozzles 124. Support frame 118 may also include one or more support plates 122 at the ends thereof which may be arranged to support frame 118 and/or other components of lower spray system 16 within oil system 10, as discussed further below. Lower spray system 16 may further include lower spray nozzles 124, lower inductor bars 126 and one or more booster bars 128.

As with support frame 44, plates 45, header 46, and support arms 48, support frame 118, header(s) 120, and support plates 122 may generally be or form a portion of the overall frame construction for oil system 10 or may alternatively be separate therefrom and connected thereto. Support frame 118, headers 120 and/or support plates 122 may likewise be constructed of any suitable material; however, it is contemplated that the support frame 118, headers 120 and support plates 122 may be constructed out of a non-conductive material. Alternatively, support frame 118, headers 120 and/or support plates 122 may be constructed of any suitable material which may be coated or otherwise treated to reduce or eliminate electrical conductivity thereof. According to one aspect, these components may be made out of PEEK plastic.

Lower spray system 16 may include one continuous header 120 extending transversely within oil system 10 to support lower spray nozzles 124 thereon. According to another aspect, as shown in FIG. 1, each lower spray nozzle 124 may have an associated header 120 connected thereto and extending between lower spray nozzle 124 and support frame 118.

Support plates 122 may further provide support for lower inductor bars 126 and booster bars 128 in that support plates 122 may connect to lower inductor bars 126 and booster bars 128 to maintain them in their operable position relative to other components. Although shown with one support plate 122 at each lateral end of lower spray system 16, additional support plates 122 may be included, as dictated by the desired implementation.

With continued reference to FIGS. 1, 2, and 2B but with additional reference to FIGS. 4 and 4A, lower spray nozzles 124 will now be discussed in more detail. Lower spray nozzles 124 may be similar to upper spray nozzles 50 in that they may include a first body portion 130, a first shim 132, a second shim 134, and a second body portion 136 all of which may be secured together via a series of fasteners 138 and fastener apertures 140. Similarly, lower spray nozzles 124 may further include an oil port 142 defined therethrough and operable to accept an oil tube 144 therein.

Oil tube 144 may be substantially similar to oil tube 74 and may include a base portion 146 which may be threaded for operable engagement with headers 120, a body portion 148, a head 149, one or more oil delivery apertures 150, and one or more O-rings 152. As with oil tube 74, oil tube 144 may have a substantially hollow interior 145 to allow the passage of oil therethrough, as discussed further below.

First body portion 130 may further include an angled surface 154 defining a leading edge 156. As with upper spray nozzles 50, the leading edge 156 (and counterparts discussed below) may define the direction in which oil may exit lower spray nozzles 124 and is therefore to be understood as the edge oriented towards the desired spray position. Unlike upper spray nozzles 50, first body portion 130 and the leading edge 156 thereof is not serrated as is the case with leading edge 86, previously discussed herein.

First shim 132 may be substantially similar to first shim 62 and may further include a plurality of teeth 158 and cavities 160 defining a leading edge 161 thereof. First shim 132 may likewise include apertures 140 and an oil port 142 defined therethrough.

Second shim 134 may be substantially similar to second shim 64 and may further include a leading edge 164 and an oil cavity 162 defined therein. As with second shim 64, the oil cavity 162 may align with oil port 142 in first shim 142 and first body portion 130 for passage of oil tube 144 therethrough. Similarly, second shim 134 may include apertures 140 defined therethrough.

Both first and second shim 132 and 134 may include alignment apertures 166 for operable engagement with alignment bar 168, which may be substantially similar to alignment apertures 96 and alignment bar 98 of upper spray nozzles 50 and may perform the same function as discussed therewith.

Figure 4:
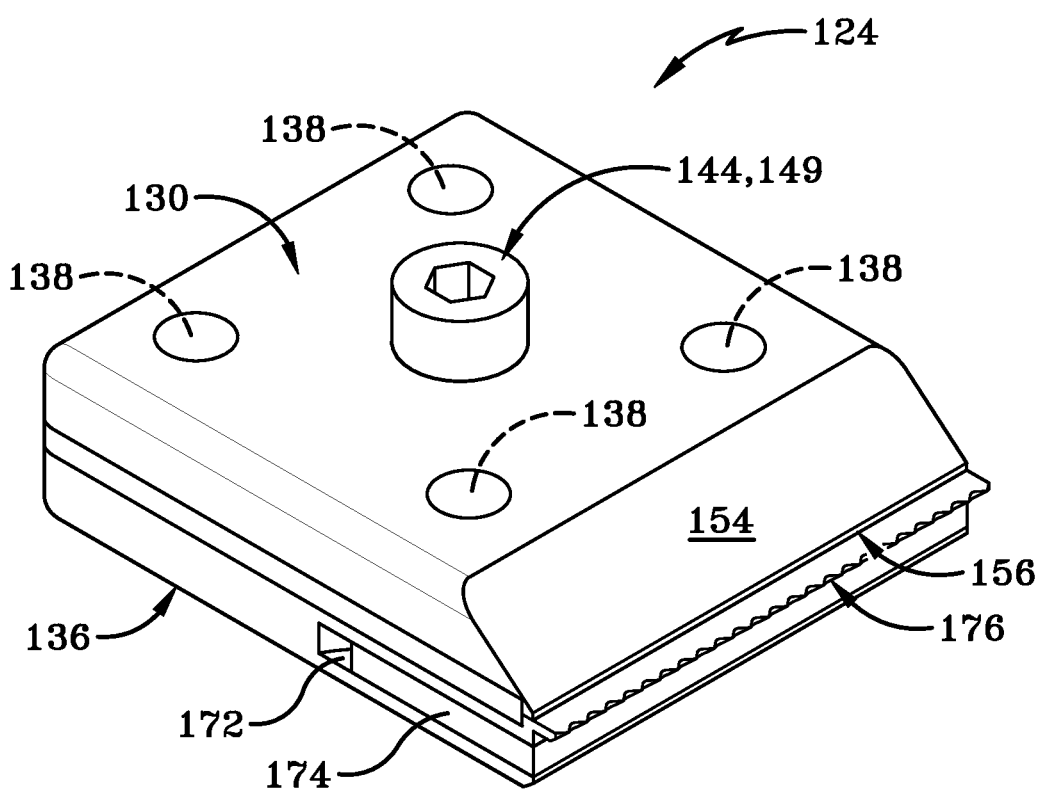
FIG. 4 is a top isometric perspective view of a lower spray nozzle of an electrostatic oiling system according to one aspect of the present disclosure.
Figure 4A:
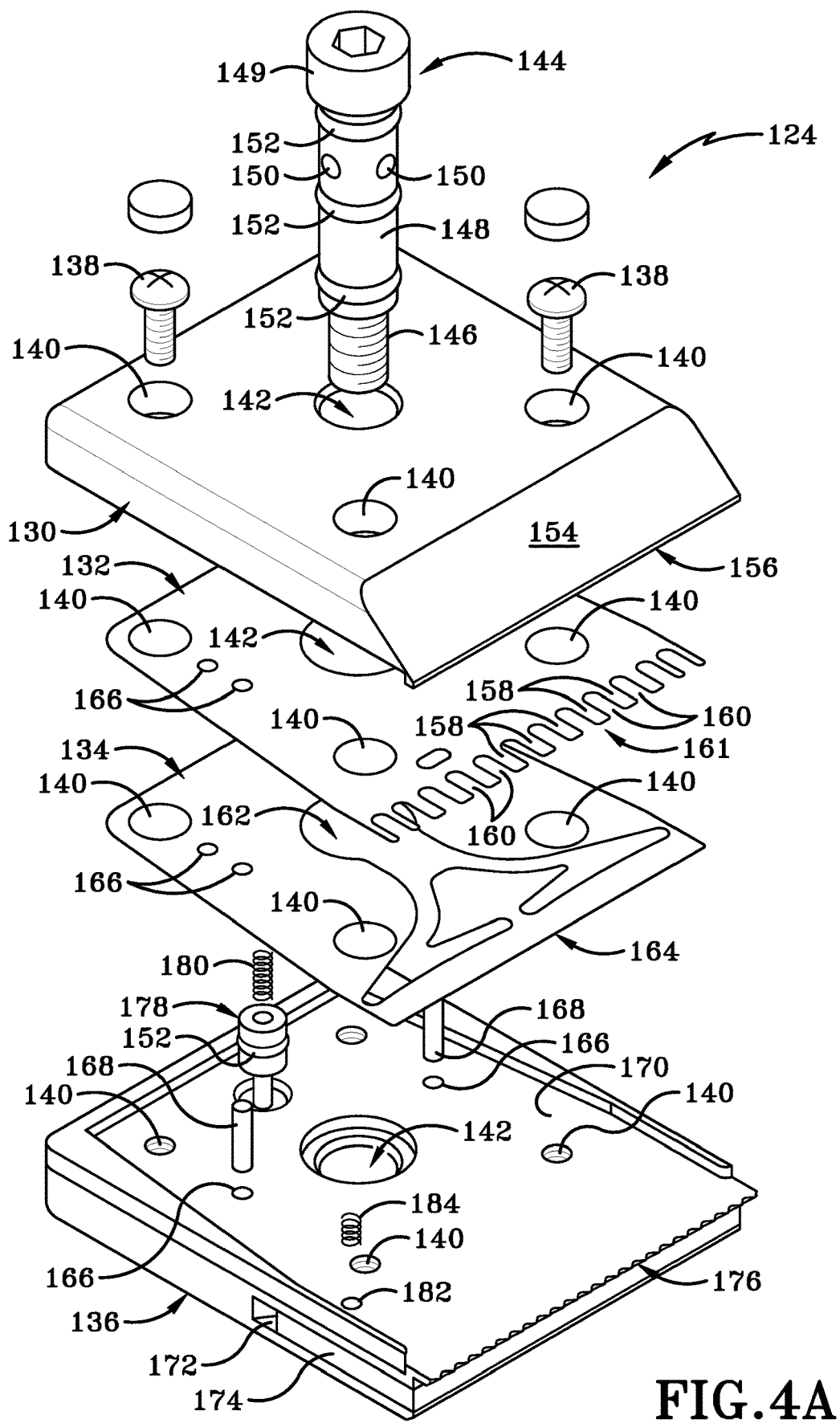
FIG. 4A is a top isometric perspective exploded view of a lower spray nozzle of an electrostatic oiling system according to one aspect of the present disclosure.

Second body portion 136 may be somewhat similar to second body portion 66 and may further include a recess 170 to accept first and second shims 132 and 134 therein when lower spray nozzles 124 are assembled, as seen in FIG. 4. Second body portion 136 may further include apertures 140 which may terminate within second body portion 136, i.e. may not extend through the full thickness of second body portion 136. Apertures 140 in second body portion 136 may likewise be internally threaded for operable engagement with fasteners 138, as dictated by the desired implementation. Second body portion 136 may further include oil port 142 defined therethrough. Additionally, second body portion 136 may further include an air valve 178 and valve spring 180, similar to first body portion 66.

Second body portion 136 may differ from first body portion 60 in that second body portion 136 does not include a vein that is the equivalent of vein 102 nor does it include valve aperture 104, check valve 106, and/or valve port 108. Instead, second body portion 136 may utilize a lateral cutout 172 and insert tray 174 to provide pressure relief therewith. Second body portion 136 may further differ from first body portion 66 in that the leading edge 176 of second body portion 136 may be the serrated edge for lower spray nozzles 124.

As with upper spray nozzles 50, lower spray nozzles 124 and the components thereof, namely first body portion 130, first shim 132, second shim 134, and second body portion 136, may be constructed of any suitable material including, but not limited to, PEEK plastic, other similar polymers or plastics, or the like. According to another aspect, lower spray nozzles 124 may be constructed of any other suitable material which may be coated or otherwise treated to reduce or eliminate electric conductivity.

As with upper spray system 14, lower spray system 16 may include one or more inductor bars, including lower inductor bars 126. Lower spray system 16 may further include one or more booster bars 128. Both lower inductor bars 126 and booster bars 128 will be described in further detail below. Similarly, lower inductor bars 126 and booster bars 128 may be best understood through the operation and function thereof, which will also be described in further detail below.

Figure 5A:
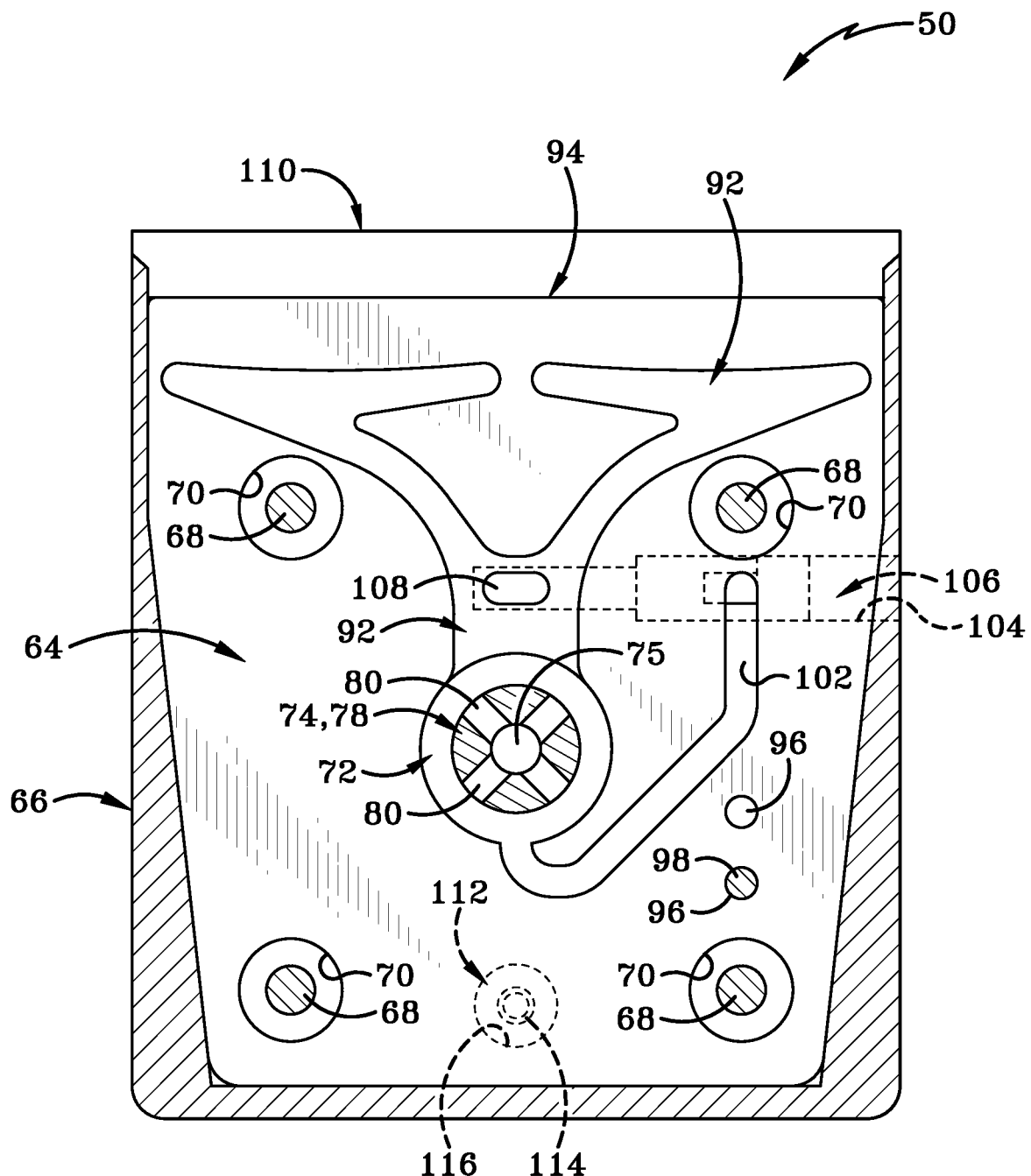
FIG. 5A is a first overhead cross sectional view of an exemplary upper spray nozzle of an electrostatic oiling system showing a first shim therein according to one aspect of the present disclosure.
Figure 5B:
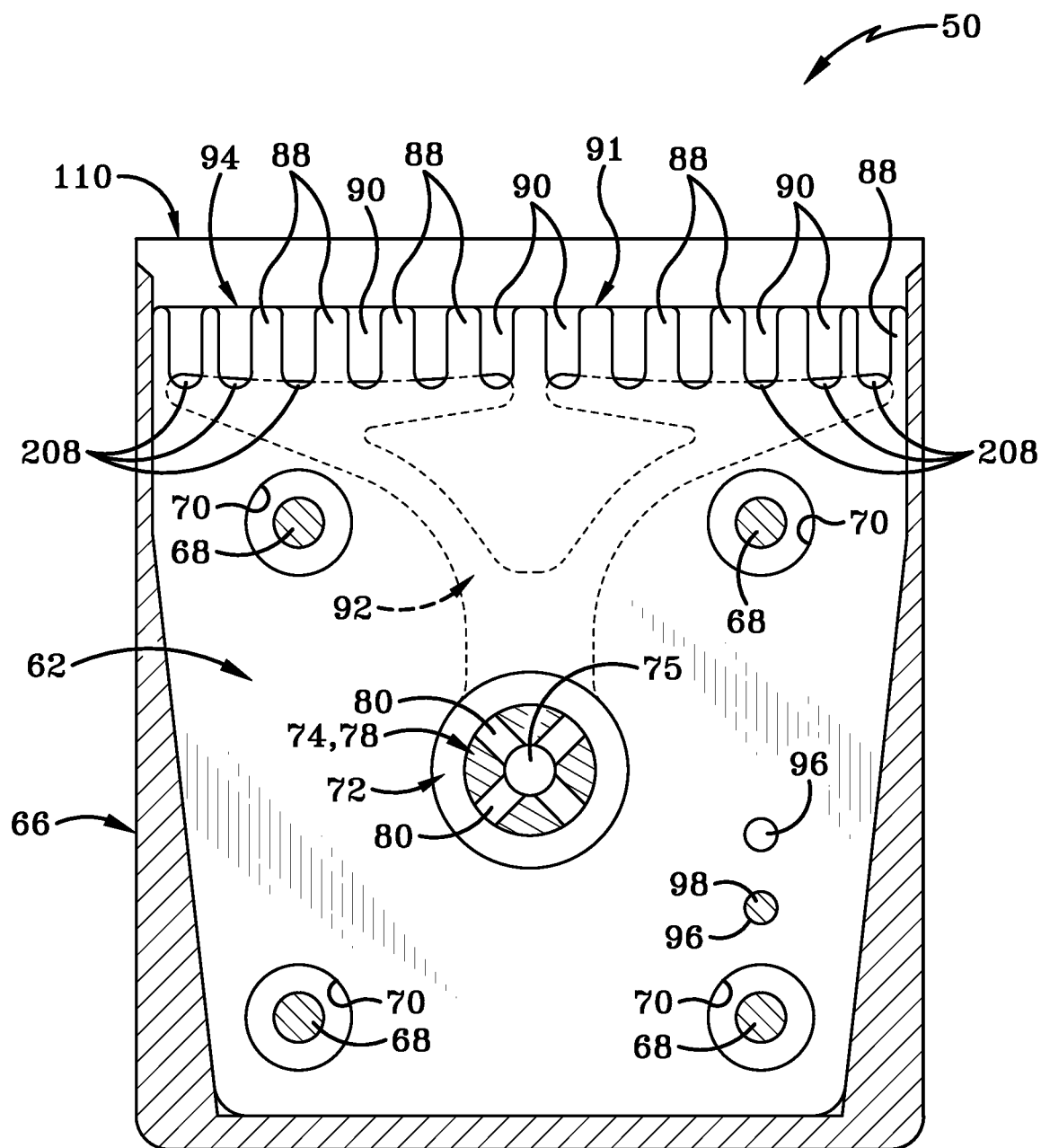
FIG. 5B is a second overhead cross sectional view of an exemplary upper spray nozzle of an electrostatic oiling system showing the first shim and a second shim therein according to one aspect of the present disclosure.
Figure 5C:
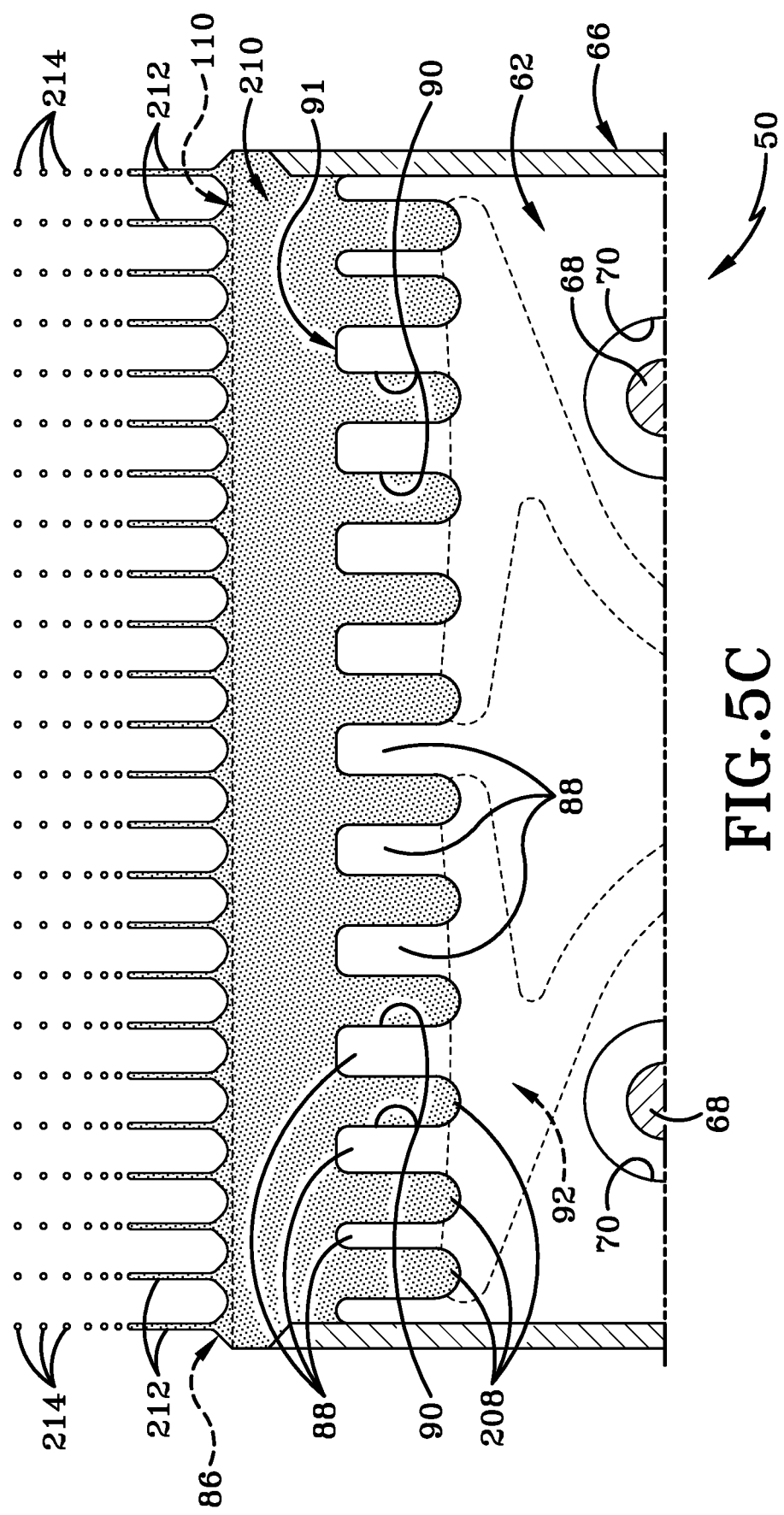
FIG. 5C is a close up partial overhead cross sectional view of an exemplary upper spray nozzle of an electrostatic oiling system with a serrated edge added thereto according to one aspect of the present disclosure.

With reference now to FIGS. 5A-5C, representative nozzles are shown with various elements thereof removed for clarity. Specifically, FIG. 5A represents an upper spray nozzle 50, shown from above with first body portion 60 and first shim 62 removed. In this view, the oil cavity 92 in second shim 64 is readily visible as are vein 102, check valve 106, and valve port 108, showing the positional relationships thereof. Further, valve aperture 104 is shown aligned and in communication with oil cavity 92, oil port 72, valve port 108, and check valve 106 within valve aperture 104. Similarly, vein 102 and its relative placement thereto further illustrates the placement and communication of these cavities for proper flow of oil and/or air therethrough, as discussed further below.

FIG. 5B represents a similar view as FIG. 5A, but with both first and second shims looking down on second body portion with first and second shims 62 and 64 installed. In this view, the relationship between the teeth 88 and cavities 90 of first shim 62 and the oil cavity 92 of second shim 64 is shown. In particular, the teeth 88 and cavities 90 forming leading edge 91 of first shim 64 are aligned with oil cavity 92 such that a bottom-most portion 208 of cavities 90 overlaps the forward edge of oil cavity 92. This overlap may allow for dynamic transfer of oil 210 from oil cavity 92 and into cavities 90 before being driven out towards leading edges 91, 94, and 110 of first and second shim 62 and 64 and second body portion 66, respectively, as discussed further below. Although not shown in the figures, lower spray nozzles 124, may be similarly arranged such that an overlapping potion of cavities 160 in first shim 132 may overlap with a forward edge of oil cavity 162 in second shim 134 to allow transfer of oil 210, as described with respect to the operation of nozzles 50 and 124 below. For clarity, and simplicity of disclosure, it will be understood that references to the bottom most portion 208 of cavities 90 are applicable to cavities 160 as well, unless specifically stated otherwise.

FIG. 5C represents a partial overhead view of FIG. 5B in an operational configuration. In this view, the serrations of serrated leading edge 86 from first body portion 60 are illustrated for reference relative to the flow of oil 210, as will be discussed in more detail with regards to the operation of oil system 10 below.

Although shown in FIGS. 5A-5C as an upper spray nozzle 50, lower spray nozzles 126 may disperse oil 210 in a similar fashion, as will be apparent from the operation of oil system 10, discussed further below.

With reference to FIGS. 1-2B, oil delivery and recovery system is generally shown at reference 18 and may include an oil reservoir 186 and may further include one or more oil delivery ports defined in the upper headers 46 and lower headers 120. These ports are shown at references 188 and 190, respectively. The header ports 188 and 190 may connect with oil tubes 74 and 144, respectively, to allow oil to be delivered therethrough. Specifically, upper and lower header ports 188 and 190 may further connect to oil channels 192 which, in conjunction with the hollow interiors 75 and 145 of oil tubes 74 and 144, may create a continuous channel allowing oil to pass therethrough. Oil delivery and recovery system 18 may further include any oil tubes, hoses, or similar piping or tubing as required to move oil throughout oil system 10, as dictated by the desired implementation.

Oil delivery and recovery system 18 may be integrally and operationally connected with vacuum system 20 which may supply the oil return portion of the oil recovery system 18. Specifically, vacuum system 20 may include a vacuum 196 with a series of vacuum tubes or hoses 198 which may apply a vacuum through upper and/or lower inductor bars 52 and/or 126, as described further below. Vacuum system 20 may further include an oil recovery vacuum tube 200 which may connect the vacuum 196 to the oil reservoir or reservoirs 186 to deliver oil back into the reservoir.

Oil delivery and recovery system 18 and/or vacuum system 20 may further include any necessary components or elements as dictated by the desired implementation. According to one aspect, oil delivery and recovery system 18 and/or vacuum system 20 may include a filtration system for oil, air, or both, as dictated by the desired implementation. According to this aspect, oil moving through oil delivery and recovery system 18 may be filtered or otherwise refined within oil tubes 194 through the use of filtration tubes or other suitable filtration devices. Similarly, oil moving through vacuum system 20 as it is recovered may be filtered within vacuum system 20 or within vacuum tubes 198, as dictated by the desired implementation. Vacuum system 20 will be further understood to include any suitable vacuum 196 and of suitable size and power, as dictated by the specific size and desired strength of oil system 10. For example, smaller oil systems 10 may utilize a smaller or lower power vacuum 196 while larger oil systems 10 may utilize a larger vacuum 196, as discussed further below.

Figure 6:
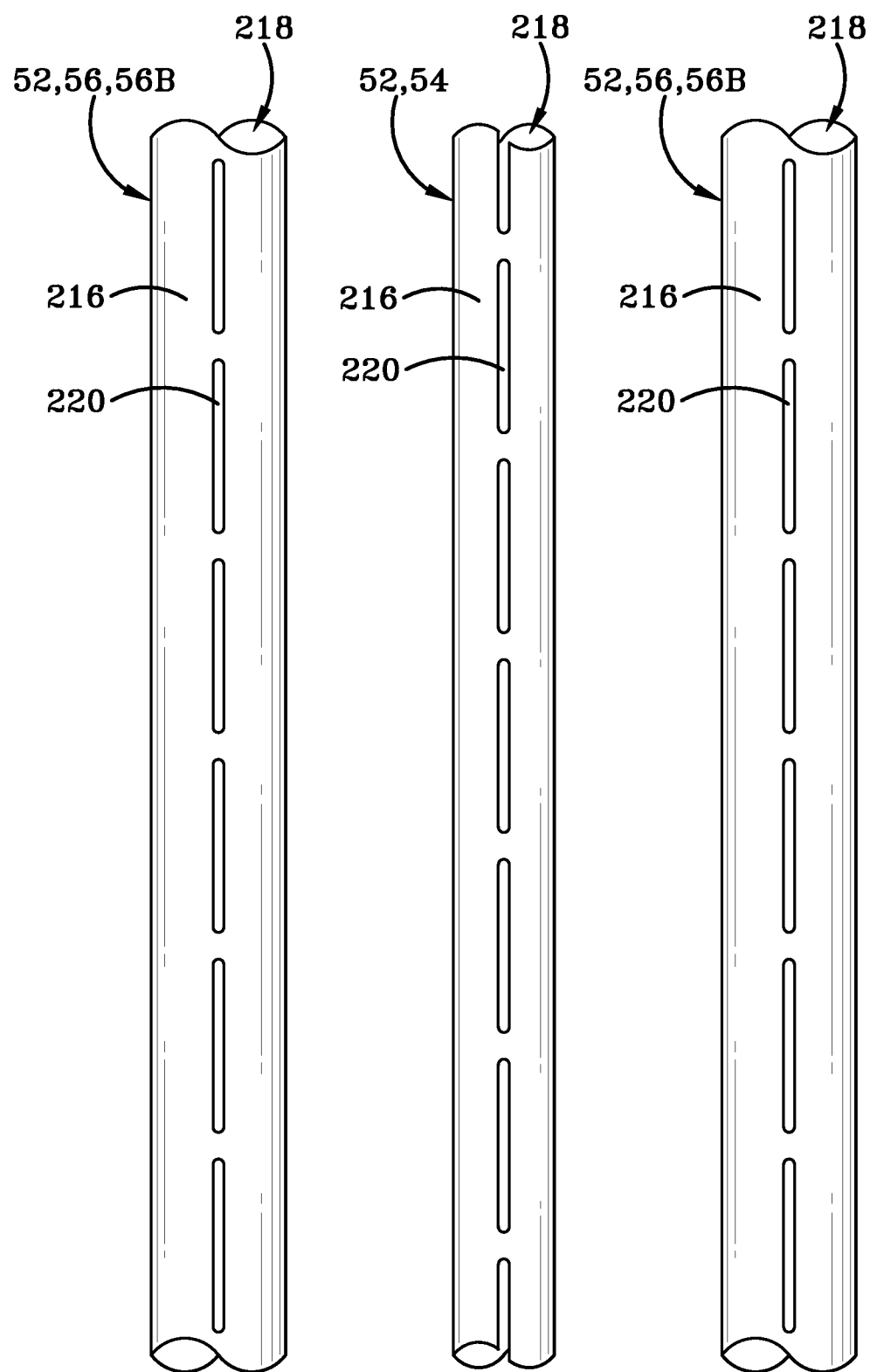
FIG. 6 is a bottom plan view of exemplary upper inductor bars of an electrostatic oiling system looking in the direction of line 6-6 in FIG. 2A according to one aspect of the present disclosure.

With reference to FIG. 6, upper inductor bars 52 are shown as center inductor bar 54 and two outer inductor bars 56. Inductor bars 52 may be substantially similar to lower inductor bars 126 except for the inclusion of slots 220, as discussed further below. Accordingly, it will be understood that, with the exception of slots 220, the description of upper inductor bars 52 may apply equally to lower inductor bars 126. Specifically, inductor bars 52 may have a generally cylindrical shape with an exterior 216 defining an open or generally hollow interior 128 with a plurality of slots 220 defined through exterior 16 to create openings into interior 218. Inductor bars 52 and 126 are described as included in upper spray system 14 and lower spray system 16 previously herein; however, inductor bars 52 and 126 may be utilized as a portion of upper spray system 14, lower spray system 16, oil delivery and recovery system 18, vacuum system 20 and power system 22, as discussed further herein. As seen in FIG. 6, center inductor bar 54 may have a diameter slightly smaller than outer inductor bars 56. According to another aspect (not shown), center inductor bar 54 and outer inductor bars 56 may be substantially identical.

Inductor bars 52 may include slots 220 for use in oil transfer through exterior 216 into interior 218 where the oil may be collected and directed back into oil delivery and recovery system 18 utilizing vacuum system 20, as discussed below. Although described and discussed herein where lower inductor bars 126 do not include slots 220 and are therefore not utilized in vacuum system 20 and oil delivery and recovery system 18, it will be understood that lower inductor bars 126 may alternatively include slots 220 therein and may further be utilized with oil delivery and recovery system 18 and vacuum system 20. Therefore, it will be further understood, that the disclosure relating to the utilization of inductor bars may equally apply to upper inductor bars 52 and lower inductor bars 126, as desired or dictated by the desired implementation thereof. Further, where inductor bars 52 and/or 126 are not utilized as a part of oil delivery and recovery system 18 and vacuum system 20, they may be solid or may have a different profile, shape, or size, as desired or as dictated by the desired implementation.

According to one aspect, inductor bars 52, 126 may be generally cylindrical and may extend substantially the entire transverse width of oil system 10 and may be constructed of any suitable material including metals or the like. As described below, inductor bars 52 and/or 126 may be utilized in oil system 10 by providing an electrical charge thereto, therefore, it is contemplated that inductor bars 52 and 126 may be constructed of a suitable conductive material, as dictated by the desired implementation thereof. Inductor bars 52 and 126 may be further understood through the use and operation thereof, and will therefore be described further below.

Power system 22 may include both a power system to provide operational power to oil system 10, i.e. the power required to operate the actual machinery and components of oil system 10 and a power system operable to electrify certain components and/or elements of oil system 10. More particularly, power system 22 may include a charge generator 202 or similar device to electrify various component and elements of oil system 10, including oil droplets, as discussed below. Charge generator 202 may be any suitable device, including any commercially available device, which is capable of generating a sufficient charge to apply voltage to the components of oil system 10, as discussed below. Power system 22 is further understood to include any associated wiring 204 and/or any other components required to deliver both operational power and/or electric charge to the desired elements and components, as discussed below.

Control system 24 may be any suitable system operable to automate or otherwise control the operation of oil system 10, as discussed below. According to one aspect, control system 24 may be, or include, one or more processors, logics, or series of logics which may be operational to oversee and control the operation of oil system 10. Control system 24 may further include a control unit 206 which may generally be a central processing unit or housing to contain control system 24 therein. According to one aspect, control system 24 may further include a user interface such as a monitor, keyboard, and/or mouse combo or any suitable user interface to allow user input and/or user control over oil system 10, as dictated by the desired implementation. Control system 24 may control any or all operations of oil system 10, as dictated by the desired implementation, and may be in direct contact with oil system 10, or may be remote therefrom and in communication therewith. Control system 24 will be understood to further include any additional components or structures necessary for proper operation thereof.

Having thus described the elements and components of oil system 10, the operation thereof and methods of use therefore will now be discussed. As many of these previously discussed components may be better defined through the operation thereof, additional elements and/or components may be introduced below as relevant to the operation of oil system 10, where necessary.

With reference to FIG. 5C, the manner in which oil 210 will exit nozzles 50 and/or 126 will now be described in more detail. It will be understood that oil 210 will flow through upper spray nozzles 50 and lower spray nozzles 126 in a similar manner, with specific differences discussed further below. In particular, oil 210 may enter nozzles 50 and 126 via oil tubes 74 and 144 through apertures 80 and 150. Oil 210 may fill or substantially fil oil cavities 92 and 162 in second shims 64 and 134 of upper and lower nozzles 50 and 124, respectively. As the oil cavities 92 and 162 fill, oil 210 may move into the cavities 160 in first shim 132 through the overlapping bottom-most portion 208 of cavities 160. From there, utilizing air pressure introduced from air valves 112, 178, oil 210 may be directed towards the leading edges of the nozzles 50 and 126. As oil 210 moves towards the leading edges, most particularly the serrated leading edges 86 of first body portion 60 of upper nozzles 50 and serrated edges 176 of second body portion 136 of lower nozzles 124, the oil 210 will naturally consolidate to the tips of each serration of serrated edges 86 and 176.

As the oil 210 flows off of the tips of each serration of serrated edges 86 and 176, it will first form a fine oil stream, indicated at reference 212, corresponding to each serration of the serrated edges 86 and 186. Each of these oil streams 212 are shown in FIG. 5C relative to the nozzles 50 and 124 in a size that is comparatively large; however, it will be understood that these streams 212 are in actuality quote narrow. Each stream 212 will begin to navigate away from the serrated edges 86 and 176 of nozzles 50 and 60 before further breaking into a plurality of miniscule oil droplets, shown at reference 214. As with streams 212, droplets 214 are again shown in FIG. 5C as relatively large droplets 214 as compared to nozzles 50 and 124 and the components thereof; however droplets 214 may be extremely fine and appear to an observer as a fine mist, as discussed further below.

In addition to air pressure facilitating the movement of oil 210 through nozzles 50 and 124 and out from the leading edges thereof, power system 22 may apply an electrical charge to the oil 210 to further direct the oil 210 is the desired directions, as discussed further below.

With reference now to FIGS. 7A-7C, the general operation of oil system 10 will now be described. Specifically, with reference to FIG. 7A, a blank 222, which may be a steel blank (or similar material), may be fed through oil system 10 starting with the feed system 12, or more particularly, the in-feeding system 12A wherein the blank 22 is moved in the direction of arrow A indicated in FIG. 7A by rollers 26. As blank 222 moves across rollers and towards a spray zone, shown as zone X, and defined as the area between the upper and lower spray systems 14 and 16, various actions are being taken within spray systems 14 and 16 in preparation of receiving the blank 222 therein. These specific actions within upper and lower spray systems 14 and 16 will be described in more explicit detail below.

As seen then in FIG. 7B, blank 222 continues to move in the direction of arrow A towards spray zone X, encountering specialized roller 27A before entering spray zone X. Specialized roller 27A will further direct blank 222 into the spray zone where oil 210 may be applied to both the top and bottom of blank 222 via a top spray 224 and bottom spray 226.

Then, as illustrated in FIG. 7C, blank 222 will continue to move through oil system 10, exiting spray zone X where it will contact specialized roller 27B before being directed to the exit feed system 12B and rollers 26 to be moved along in the manufacturing process. As mentioned above, each of these stages involve various actions which occur within spray systems 14 and 16 depending upon the position of blank 222 within oil system 10. Again, these actions within spray systems 14 and 16 will be described in more explicit detail below.

Thus, generally speaking, oil system 10 may work on a continuous or semi-continuous cycle wherein multiple blanks 222 may be fed through system 10 in a similar fashion with each blank 222 receiving a spray of oil 210 on both sides thereof before moving on to the next station in the stamping process. According to one aspect, blanks 222, as mentioned above, may be steel blanks utilized for stamping body panels for automobiles. Where blanks 222 are formed from metal, blanks 222 may be electrically grounded. According to another aspect, blanks 222 may be any suitable material for use in any stamping operation, as dictated by the desired implementation.

Similarly, and as dictated by the desired implementation, oil 210 may be any suitable lubrication or spray oil as required by the specific application thereof. For example, wherein blank 222 is steel, oil 210 may be a first type of oil while in applications where blank 222 may be a different type of material, for example, aluminum, oil 210 may be a different type or may be similar oil 210 with different weight or properties, as desired. Further, the amount of oil 210 applied to a blank 22 may vary due to the implementation parameters. According to one example, oil 210 may be applied in concentrations of 50, 75, 100, or 150 milligrams per square foot of coverage depending on the speed at which the blank 222 moves through the spray zone X. Similarly, the speed of blank 222 moving through the spray zone may be variable according to the implementation parameters. According to one aspect, this speed may be in a range from 150 feet per minute to 600 feet per minute. This speed may further determine the concentration of oil 210 coverage. For example, at 150 feet per minute, the concentration of oil may be 50 milligrams per square foot. According to another aspect, the speed and or oil coverage may further vary from these ranges as dictated by the specific use and or implementation of oil system 10.

The actual movement of blank 222 through oil system 10 may be monitored via any suitable system or systems, such as weight sensors, contact sensors, optical sensors, or the like. According to one aspect, an optical sensor or series of optical sensors may be utilized as an in-feed blank detection system and an out-feed blank detection system that may determine and monitor the location of each blank 222 within oil system 10 as well as measure and/or monitor parameters such as blank 222 speed, size, and other similar operational aspects of system 10 to properly time oil spray within the spray zone X to effectively coat each blank 222 in its entirety.

With continued reference to FIGS. 7A-7C, there may be three main states or statuses of oil system 10. In particular, a first status, as represented in FIG. 7A, may be a first ready status or ready state wherein a blank 222 is detected and/or expected to enter the spray zone X, of oil system 10. This may be the status of system 10 when a blank 222 is not in the spray zone X but is expected, or is detected in the in-feed system 12A. This first state may be substantially similar to the third state in terms of the status of upper and lower spray systems 14 and 16, as discussed below. The second status (FIG. 7B) may be that of an active spray status wherein the blank 222 is within the spray zone X and oil 210 is actively being applied thereto; while a third status (FIG. 7C) may again be a ready status, except it will represent a status once the blank 222 leaves the spray zone X. Each status is discussed further below.

In all status conditions, as mentioned above, sensors may be utilized to continue to monitor the position, speed, movement, or the like, or any other suitable parameters as dictated by the desired implementation, of blank 222 as it moves through oil system 10. These sensors, again, may be any suitable sensors or combination of sensors including optical sensors, pressure sensors, contact sensors, or the like. In this second state, sensors both on the in-feed side, i.e. the side of oil system 10 with in-feed system 12A and on the exit side, i.e. out-feed system 12B may be actively monitoring blank 222 to determine the proper timing for starting and stopping upper and lower oil sprays 224 and 226. Sensors may continue to monitor blank 222 until such time as blank exits oil system 10 completely via any suitable mechanism, as determined by the specific implementation thereof. Sensors are contemplated to be operable to monitor multiple blanks as they move through the system, and to trigger automatic response of the oil spray system 10 according to the position of each blank. Accordingly, as multiple blanks 222 are fed through system it will be understood that the upper and lower spray systems 14 and 16 may transition between ready and active states multiple times and in rapid succession.

Figure 8A:
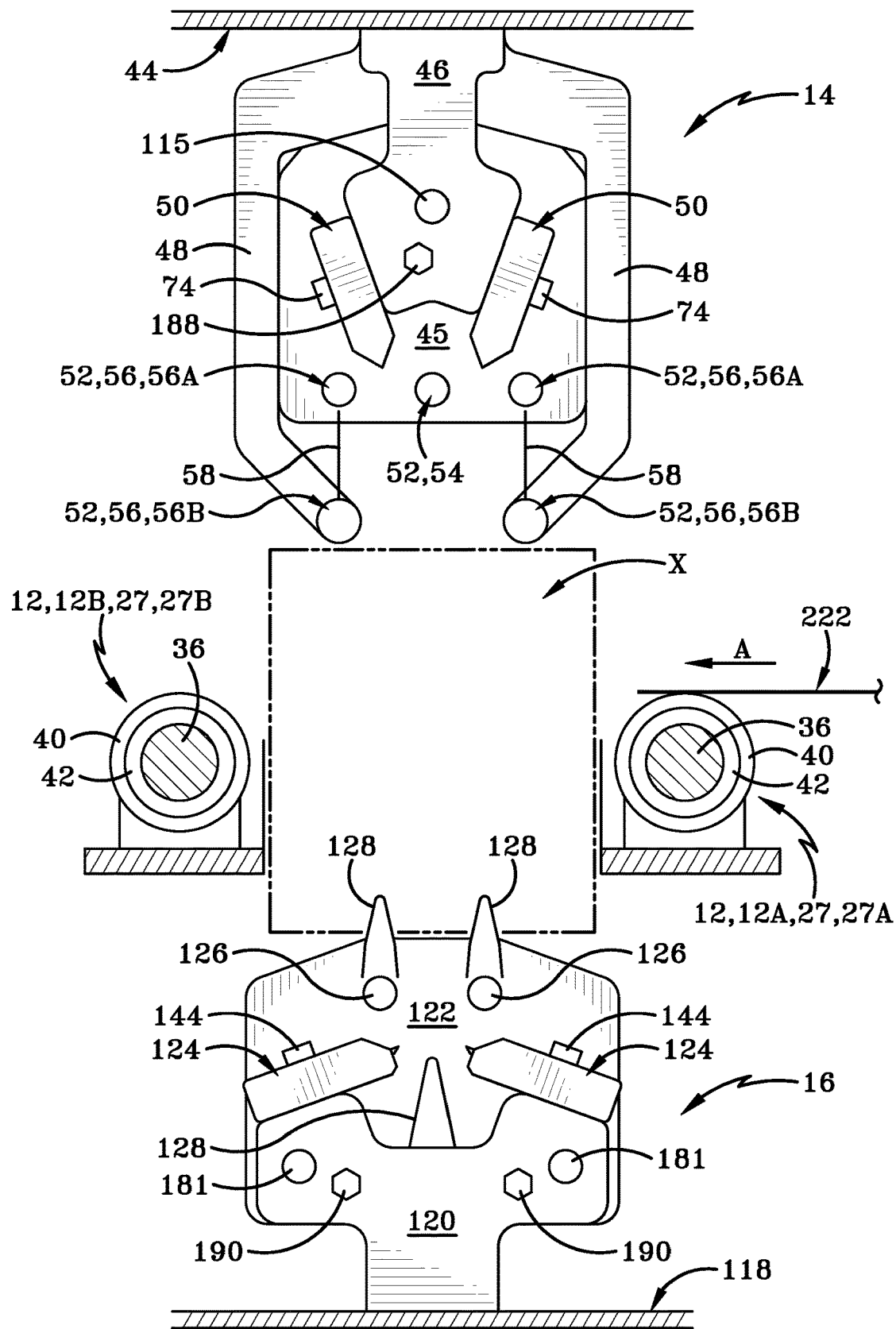
FIG. 8A is a first cross sectional operational view of an electrostatic oiling system according to one aspect of the present disclosure.
Figure 8B:
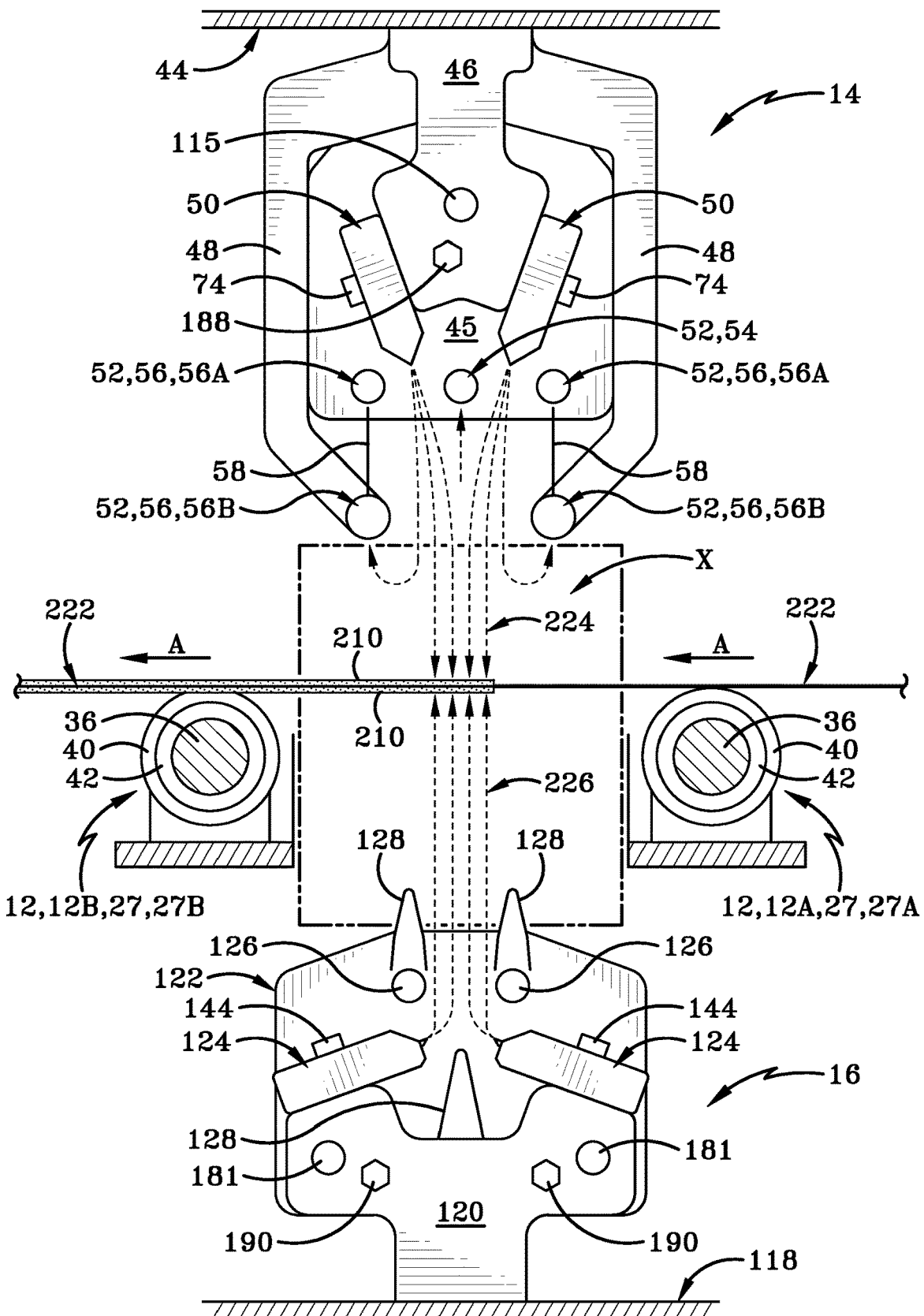
FIG. 8B is a second cross sectional operational view of an electrostatic oiling system according to one aspect of the present disclosure.
Figure 8C:
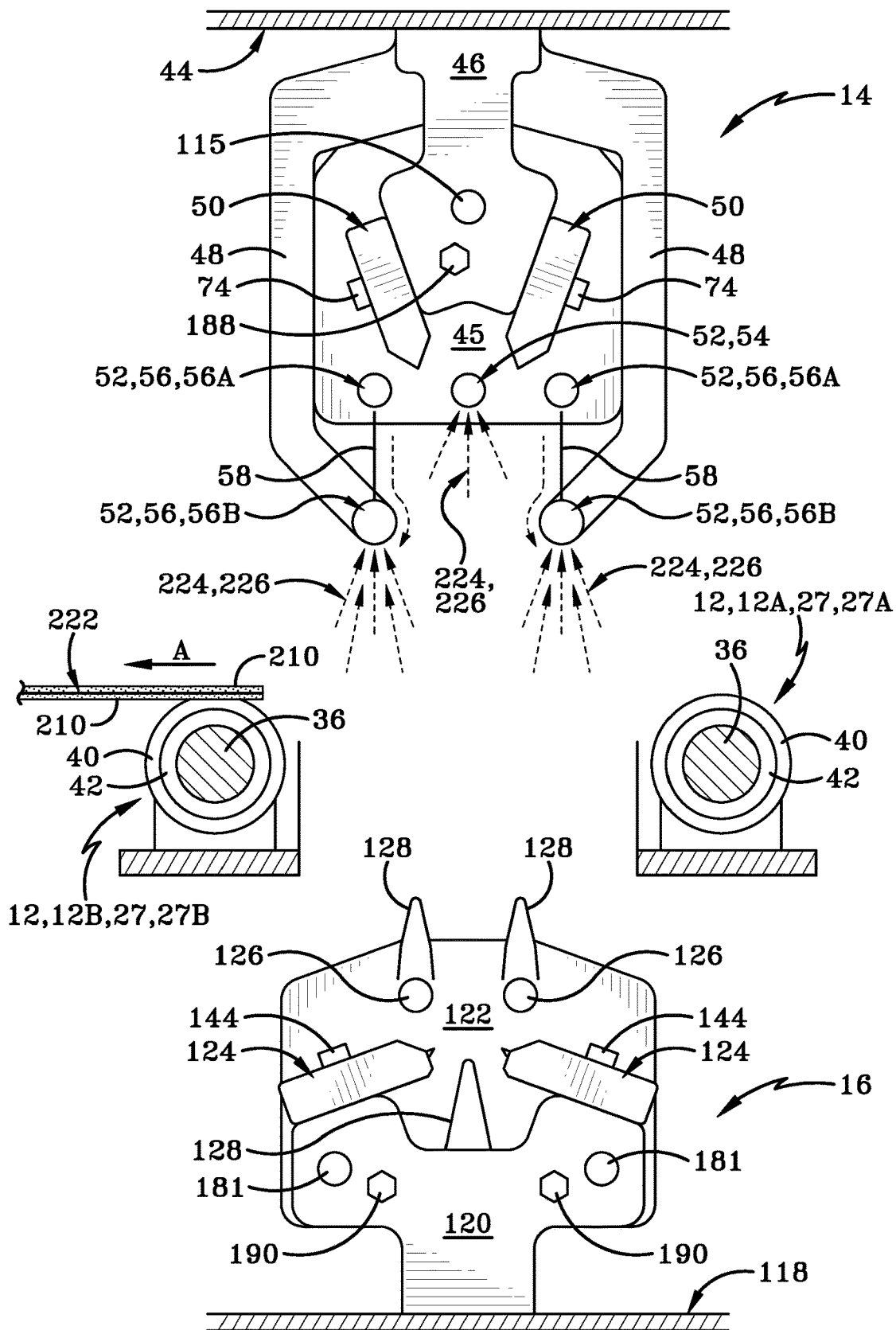
FIG. 8C is a third cross sectional operational view of an electrostatic oiling system according to one aspect of the present disclosure.

With reference to FIGS. 8A-8C, the particulars of the operation of upper and lower spray systems 14 and 16 will now be described in more detail. Specifically, as seen in FIG. 8A, oil system 10, or more specifically, upper and lower spray systems 14 and 16 are shown in a "resting" stage which may be the first stage correlating to FIG. 7A wherein blank 222 has not yet entered the spray zone of oil system 10. In this resting stage, a blank 222 may be detected by an in-feed blank detection system, as discussed above, and upper spray system 14 and lower spray system 16 may begin transitioning from the resting state to an active spray state. This may involve increasing and/or changing the voltage applied to various components of upper and lower spray systems from a resting voltage to a spray voltage, as described further below.

FIG. 8B correlates with FIG. 7B in that FIG. 8B illustrates the second condition, i.e. the spray condition, wherein oil 210 is being actively applied to both sides of blank 222. In this position, upper and lower spray systems 14 and 16 and the components thereof are charged and maintained at their spray voltages, as discussed further below. This second status or condition is again defined by the active application of oil spray to the blank 222 as well as by the applied voltages to the various components of upper and lower spray systems 14 and 16, discussed herein.

Similarly, FIG. 8C may correspond to FIG. 7C in that oil system 10 is shown as blank 222 exits the spray zone of oil system 10. In this third state, the various components of upper and lower spray systems 14 and 16 may return to their resting voltages and resting conditions. Accordingly, as described herein and further below, the three operational conditions may be further understood by the mechanisms by which upper and lower spray systems 14 and 16 transition from resting to active spray and back to resting conditions.

As seen in FIGS. 8A (and 7A), in the first stage, various components of upper and lower spray systems 14 and 16 may be charged or electrified to varying voltages to effect the flow of oil in a particular way. Specifically, the oil 210 itself may be charged to a first voltage which, according to one aspect, may be a same or similar voltage as applied to upper and lower nozzles 50 and 124. In the resting state, according to one aspect, the upper and lower nozzles 50 and 124 and oil 210 may be charged to approximately 20 kV. According to another aspect, oil 210 may be charged to a different voltage than other components. For example, oil may be charged to approximately 37 kV while upper and lower nozzles 50 and 124 may be charged to 20 kV in the resting state. Further, upper and lower spray nozzles 50 and 124 are maintained at this resting voltage at any time during which a blank 222 is not present within spray zone X. Similarly, in the resting state, the center inductor bar 54 may be charged to 15 kV while outer inductor bars 56A, 56B and charge wall 58 may be maintained at 0 kV.

In all states, including the resting state, oil 210 may be discharged from nozzles 50 and 124 continuously in the manner previously provided herein; however, vacuum 196 may be similarly maintained in an operational condition in all operational states to draw excess oil 210 up into center inductor bar 54 and the outer inductor bars 56B through slots 220 provided therein. As discussed below, the flow of oil 210, or more particularly, the manner in which oil 210 moves through oil system 10 may change based on the state in which oil system 10 is operated. Specifically, in the resting state, the 0 kV charge to inductor bars 54 and 56 may cause the oil 210 exiting upper spray nozzles 50 to be attracted towards the inductor bars 52 where it may be vacuumed and recovered through vacuum system 20 and oil delivery and recovery system 18. Similarly, the lower spray system 16 and lower spray nozzles 124 may be maintained at a resting voltage of approximately 20 Kv, but may continuously discharge oil 210 therefrom. Again, as it is desirable to avoid the oil forming droplets and/or dripping onto blanks 222, the vacuum system 20 and vacuum 196 may remain active at all times to draw the oil 210 from lower spray nozzles 50 into the upper inductor bars 52 when a blank 222 is not within the spray zone X.

As previously described herein, lower inductor bars 126 are not illustrated having slots 220 therein, therefore the vacuum 196 is not contemplated to be operated within the lower spray system 16 itself; however, it will be understood that lower inductor bars 126 could be provided with slots 220 defined therein to allow vacuuming from the lower spray system, as desired. As it is less important to prevent drips below the blank 222, vacuums are not required in lower spray system 16 to recover excess oil 21, but vacuums may be employed where desired or where the specific installation parameters so require. As described herein, for simplicity and clarity in the disclosure, it is contemplated that excess oil 210 within the bottom spray system 16 may be recovered by upper spray system 14, specifically through upper inductor bars 52, if the lower oil spray 226 rises above a level at which the blank 222 moves through the spray zone X.

As a blank 222 then enters spray zone X or otherwise reaches a threshold position indicating the imminent entrance of a blank 222 into the spray zone X, both upper and lower spray systems 14 and 16 may transition to the second state, which may include a transition to a spray voltage for the components thereof.

In particular, with reference to FIG. 8B, as a blank 222 enters the spray zone X, the voltage of upper and lower nozzles 50 and 124 may be increased from the resting voltage of approximately 20 kV up to approximately 37 kV. Similarly, outer inductor bars 56 and charge walls 58 of upper spray system 14 may be increased to 13 kV while center inductor bar 54 may remain or otherwise be maintained at the 15 kV charge. This differential in voltage between the center inductor bar 54 and outer inductor bars 56 causes some attraction of oil 210 towards the outer inductor bars 56, which may result in the upper spray 224 spreading out to provide an even oil 210 coat on a top surface of blank 222 while simultaneously allowing the vacuum 196 to draw any excess oil 210 particles or fine mist droplets 214 through slots 220 in center inductor bar 54 and outer inductor bars 56B. This may then cause oil 210 to remain within the spray zone X and prevent any spray from exiting the oil system 10 and into the surrounding environment. The retention of oil 210 within spray zone X/oil system 10 is critical as any excess oil 210 escaping the spray zone X may contact other blanks 222 which may negatively affect the amount of oil 210 present on a surface thereof. Similarly, oil 210 exiting the spray zone X may cause additional maintenance in the form of cleaning and/or degreasing parts as the oil 210 accumulates.

In the second state, lower spray system 16 may likewise increase the lower nozzles 124 to a voltage of approximately 37 kV while lower inductor bars 126 and lower booster bars 128 may be charged to approximately 6 kV. As best seen in FIG. 8B, this may provide bottom spray 226 with an appropriate spread and may further direct or cause the oil droplets 214 in bottom spray 226 to move upwards to coat a bottom surface of blank 222, again ensuring an even coat of oil 210 thereon. Booster bars 128 may serve to further direct oil 210 upwards towards blank 222 and to further keep the droplets 214 in suspension while creating a channel for the oil 210 to pass through. This arrangement may likewise further prevent oil 210 from lower spray system 16 from exiting the spray zone X as it is physically blocked by blank 222 on a top side and lower inductor bars 126, booster bars 128 and specialized rollers 27 and the mounting assemblies therefore.

As mentioned above, the blank 222 may be electrically grounded which may further serve to attract oil droplets 214 to the surfaces thereof to further direct the oil 210 to the desired location further reducing oil 210 lost to the environment outside of the spray zone X.

With reference then to FIG. 8C, as the blank 222 exits the spray zone X, the components of upper and lower spray systems 14 and 16 may then return to their resting voltages, i.e. upper spray nozzles 50 may be reduced back to 20 kV and the upper inductor bars 52, or more particularly, the outer inductor bars 56, may be reduced to 0 kV while the center inductor bar 54 may remain at 15 kV. In lower spray system 16, lower inductor bars 126 and booster bars 128 may remain at 6 kV while lower spray nozzles 124 are again reduced to 20 kV.

This return to the resting state may cause any oil 210 remaining in spray zone X to be attracted towards the outer inductor bars 56B via the charge differential and these excess oil droplets 214 may then be vacuumed through slots 220 to prevent drips and/or spray exiting the spray zone X, as described above. This overall process, i.e. the transition from the resting state to the spray state and back to the resting state, may be repeated for each blank 222 that is fed through oil system 10. These transitions between states may occur rapidly; however, the continuous oil spray and always on vacuum functions of oil system 10 may allow for a precise application of oil 210 to blank 222 while reducing the voltage needed to operate the system 10, the size and strength of vacuum system 20, and may further allow the air pressure utilized within nozzles 50 and 124 to be scaled down to approximately 0.1 psi or less, thus resulting in less overspray, among other benefits. This arrangement and operation may further eliminate the need for metering pumps and may also eliminate the need for doors to create a negative vacuum system in the spray zone X between oil applications to subsequent blanks. In this sense, electrostatic oiling systems may be efficiently, quickly, and consistently utilized in non-continuous batch or blank systems.

Further, any oil 210 being captured by vacuum system 20 through the inductor bars 52 may be transported through vacuum tubes 198 and may be reprocessed and/or filtered before then traveling through oil recovery vacuum tube 200 and back into oil reservoir 186 for reuse in oil system 10. The ability to recycle and reuse oil 210 within oil system 10 on a continuous or semi-continuous basis may further reduce cost and increase efficiency as the oil waste is reduced or eliminated.

According to one aspect, during the resting states, i.e. the status or the conditions during which a blank 222 is not within the spray zone X of oil system 10, heated air may be circulated through the upper and/or lower spray systems 14, 16 to rapidly deionize any charged air particles that may remain within spray zone X as a result of the voltages applied to the oil and spray components. This may quickly deionize the air, which may further increase the attraction of any oil droplets 214 to the center and out inductor bars 54 and 56B where they may be recovered by vacuum system 20 and oil delivery and recovery system 18.

Although described herein with specific voltages for various components of oil system 10, it will be understood that other voltages may be used or applied as dictated by the desired implementation. Further, it will be understood that the charges applied to these components may be positive or negative voltages as desired, or may alternatively vary depending on the parameters of the specific implementation. Further, the voltages and charges of these components may be changed or changeable to provide additional directional effects on the spray of oil within system 10. For example, for larger systems, a broader spray pattern may be desirable, so the voltages may be adjusted to provide a wider spray of oil.

Figure 9:
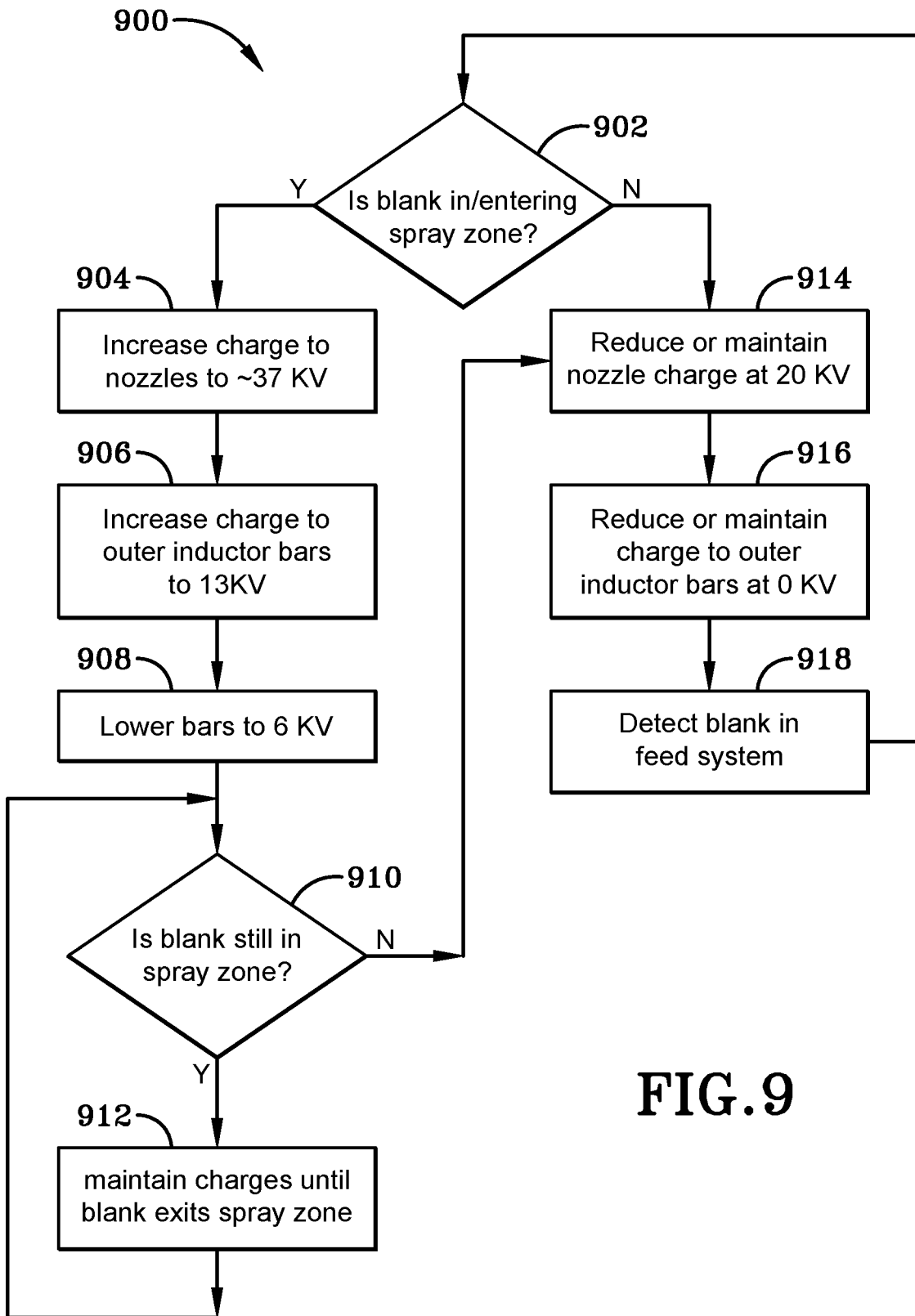
FIG. 9 is a decision tree flow chart of an exemplary method of operation for an electrostatic oiling system according to one aspect of the present disclosure.

With reference to FIG. 9, a decision tree style flow chart is provided to show and/or determine the proper status or voltage condition for oil system 10, or more particularly, for upper and lower spray systems 14 and 16. As discussed previously herein, a key determining factor for which state in which upper and lower spray systems 14 and 16 are operated is directly related to the presence of a blank 222 within or imminently within the spray zone X of oil system 10.

Accordingly, the process and decision tree, indicated as process 900, may begin with that determination of blank 222 presence/position at step 902. If a blank 222 is present or is imminently entering the spray zone X, that blank 222 will have been detected in the in-feed system 12A and the position may be monitored through sensors, as discussed previously herein.

Then, when the blank 222 is detected in position, upper and lower spray systems 14 and 16 may transition from a ready state to a spray state. In this transition, shown as step 904, the charge to the upper and lower spray nozzles 50 and 124 may be increased to approximately 37 kV. Simultaneously, or in rapid succession, the charge to the outer inductor bars 56 and charge wall 58 may be increased to 13 kV (step 906) and the charge to lower inductor bars 126 may be increased to 6 kV (step 908) if not already maintained as such. Again, as discussed above, the oil 210 spray and vacuum system 20 may be continuously operated in both the resting state and spray state.

Therefore, the next determination may be to establish whether or not blank 222 remains within the spray zone X, seen at step 910. If the blank 222 is still in the spray zone X, the charges to these components will be maintained (step 912) until such time as the blank 222 is no longer detected within the spray zone X. Put another way, as long as the blank 222 is within the spray zone X, the charges to the spray system 14, 16 components will be maintained. Accordingly, steps 910 and 912 may be repeated and/or performed continuously until such time that the determination in step 910 changes from yes to no, meaning the blank 222 is no longer within the spray zone X.

Once the blank 222 completely exits the spray zone X and is no longer detected therein, the upper and lower spray systems 14 and 16 may then return to the resting state wherein the nozzles may be reduced and maintained at a voltage of approximately 20 kV, as seen at reference 914.

Simultaneously or in rapid succession, the outer inductor bars 56 and charge wall 58 may be reduced to 0 Kv (step 916) and these voltages may be maintained along with the charges for inductor bar 54, outer inductor bars 56, lower inductor bars 126, and booster bars 128, as previously described herein.

While in the resting state, oil 210 may continue to be discharged from nozzles 50 and 124 and recovered by vacuum system 20 until a blank is again detected within the in-feed system 12A, as indicated at reference 918.

Thus, once a blank 222 is detected in in-feed system 12A (step 918), the process 900 may repeat in that the position of the blank 222 in the in-feed system 12A may be monitored until the blank 222 is imminently entering the spray zone X. Then, as indicated by the determination in step 902, the process 900 may be repeated.

Similarly, as indicated by the "no" arrow from the determination made in step 902 of process 900, if a blank 222 is not detected within or imminently entering the spray zone X, but having previously been detected in the in-feed system, process 900 may dictate that the resting charges of upper and lower spray systems 14 and 16 may be maintained until such time as a blank 222 is detected entering the spray zone X. Accordingly, it is contemplated that the determination made in step 902 of the overall position of a blank 222 within oil system 10 may be made on a continuous or semi-continuous basis, as dictated by the desired implementation.

As described herein, numerous advantages may be presented by the apparatus and method discussed herein; however, it will be understood that modifications made to the apparatus and/or process may be made while still providing similar benefits to a similarly situated oil system such as oil system 10. Accordingly, it will be understood that not all advantages discussed herein may be realized in every system as the specific implementation thereof may vary from each installation to the next. Overall, however, advantages of reduced oil usage, reduced voltage and psi and reduced or eliminated oil spray exiting the spray zone are likely to be realized in most, if not all, implementations of oil system 10, as discussed herein. Further advantages may be provided or realized other than those discussed herein.

It will be further understood that all systems described herein may include any additional elements or components, as necessary, for proper operation thereof. It is contemplated that these components may be standard or otherwise commercially available components and may be or include, but are not limited to, frame members, mounting arrangements or mounting members, fasteners, connectors, wiring, or other similar peripheral components. Additionally, it will be understood that oil system 10 may further include any necessary or desired safety systems, as dictated by the desired implementation, including automatic shut-offs, voltage protection devices, emergency shut-off controls, or other similar safety features, as dictated by the desired implementation.

It will be further recognized that although shown and described herein as sized for a single blank, oil system may be limited in size only by the installation parameters and may handle multiple blanks and/or feeds simultaneously, in parallel, or may be modified or adapted to handle blanks of any suitable or desired size, as again dictated by the desired implementation. Accordingly, although shown with a limited number of nozzles in both upper and lower spray systems 14 and 16, it will be understood that any suitable number of nozzles may be provided, as desired. Similarly, any suitable number of associated components may be provided, as well.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0. % of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An oil spray nozzle comprising:
   a first body portion having a leading edge on a side thereof;

a first shim having a leading edge corresponding to the leading edge of the first body portion, the leading edge of the first shim having a plurality of alternating teeth and cavities defined therein;

a second body portion having a leading edge corresponding to the leading edges of the first body portion and first shim;

a second shim having a leading edge corresponding to the leading edges of the first and second body portions and first shim, the second shim further defining an oil cavity therein;

an oil aperture defined through the first body portion, first shim, and second body portion and aligned with the oil cavity defined in the second shim; and an oil tube disposed through the oil aperture and oil cavity operable to deliver oil into an interior of the nozzle;

wherein the leading edges of the first and second body portions and first and second shims further define an oil edge of the nozzle and wherein the cavities defined in the leading edge of the first shim overlap with the oil cavity defined in the second shim to direct oil from the oil tube to the oil edge of the nozzle.

2. The nozzle of claim 1 wherein the leading edge of the first body portion further comprises:
a serrated leading edge.

3. The nozzle of claim 2 wherein the second body portion further comprises:
an oil vein in operable communication with the oil aperture defined in the second body portion, the oil cavity defined in the second shim, and a valve aperture defined in the second body portion; and
a check valve within the valve aperture.

4. The nozzle of claim 3 wherein the oil vein is machined into the second body portion.

5. The nozzle of claim 3 further comprising:
an air valve operable to deliver pressurized air into the interior of the nozzle.

6. The nozzle of claim 5 wherein oil within the interior of the nozzle is driven out of the nozzle at the oil edge by the pressurized air.

7. The nozzle of claim 1 wherein the leading edge of the second body portion further comprises:
a serrated leading edge.

8. The nozzle of claim 7 further comprising:
an air valve operable to deliver pressurized air into the interior of the nozzle.

9. The nozzle of claim 8 wherein oil within the interior of the nozzle is driven out of the nozzle at the oil edge by the pressurized air.

10. The nozzle of claim 1 wherein the first and second body portions and first and second shims are formed of Polyether ether ketone (PEEK) plastic.

11. An oil spray system comprising:
at least one upper nozzle further comprising:
a first body portion having a serrated leading edge on a side thereof;
a first shim having a leading edge with plurality of alternating teeth and cavities defined therein;
a second body portion;
a second shim further defining an oil cavity therein;
an oil aperture defined through the first body portion, first shim, and second body portion and aligned with the oil cavity defined in the second shim;
an oil tube disposed through the oil aperture and oil cavity operable to deliver oil into an interior of the nozzle;
an oil vein in operable communication with the oil aperture defined in the second body portion, the oil cavity defined in the second shim, and a valve aperture defined in the second body portion; and
a check valve within the valve aperture;
at least one lower nozzle further comprising:
a first body portion;
a first shim having a leading edge with plurality of alternating teeth and cavities defined therein;
a second body portion having a serrated leading edge on a side thereof;
a second shim further defining an oil cavity therein;
an oil aperture defined through the first body portion, first shim, and second body portion and aligned with the oil cavity defined in the second shim; and
an oil tube disposed through the oil aperture and oil cavity operable to deliver oil into an interior of the nozzle;
a spray zone defined between the at least one upper spray nozzle and the at least one lower spray nozzle;
at least one upper inductor bar associated with the at least one upper spray nozzle, the at least one upper inductor bar having at least one slot defined through an exterior thereof; and
a vacuum system operable to vacuum excess oil from the spray zone through the at least one opening defined through the exterior of the at least one upper inductor bar.

12. The oil spray system of claim 11 wherein the upper spray nozzle further comprises:
an oil edge of the nozzle defined by the serrated leading edge of the first body portion and the leading edge of the first shim; wherein the cavities defined in the leading edge of the first shim overlap with the oil cavity defined in the second shim to direct oil from the oil tube to the oil edge of the nozzle.

13. The oil spray system of claim 11 wherein the lower spray nozzle further comprises:
an oil edge of the nozzle defined by the serrated leading edge of the second body portion and the leading edge of the first shim; wherein the cavities defined in the leading edge of the first shim overlap with the oil cavity defined in the second shim to direct oil from the oil tube to the oil edge of the nozzle.

14. The oil spray system of claim 11 wherein each of the upper spray nozzle and lower spray nozzle further comprise:
an air valve operable to deliver pressurized air into the interior of the nozzle.

15. A method of spraying oil comprising:
providing an oil spray nozzle comprising;
a first body portion having a leading edge on a side thereof;
a first shim having a leading edge corresponding to the leading edge of the first body portion, the leading edge of the first shim having a plurality of alternating teeth and cavities defined therein;
a second body portion having a leading edge corresponding to the leading edges of the first body portion and first shim;
a second shim having a leading edge corresponding to the leading edges of the first and second body portions and first shim, the second shim further defining an oil cavity therein;
an oil aperture defined through the first body portion, first shim, and second body portion and aligned with the oil cavity defined in the second shim; and an oil tube disposed through the oil aperture and oil cavity operable to deliver oil into an interior of the nozzle;

wherein the leading edges of the first and second body portions and first and second shims further define an oil edge of the nozzle and wherein the cavities defined in the leading edge of the first shim overlap with the oil cavity defined in the second shim to direct oil from the oil tube to the oil edge of the nozzle;

delivering oil through the oil tube disposed in the oil aperture defined in the oil spray nozzle into the interior of the spray nozzle;

filling the oil cavity defined in the second shim with oil;

transferring oil from the oil cavity into a series of the cavities defined in the leading edge of the first shim that at least partially overlap the oil cavity of the second shim;

driving the oil out of the cavities along a serrated leading edge of a body of the oil spray nozzle via pressurized air; and causing oil to spray from the oil spray nozzle to a location remote therefrom.

16. The method of claim 15 wherein driving the oil further comprises:

directing the oil to a tip of each serration of the serrated leading edge to cause a stream of oil exiting the oil spray nozzle from each serration of the serrated leading edge; and breaking each stream of oil from each serration into oil droplets further defining the oil spray.

17. The method of claim 15 further comprising:

charging the oil to a first voltage; and charging the nozzle to a second voltage.

18. The method of claim 17 wherein the first voltage is greater than the second voltage.

19. The method of claim 18 wherein the first voltage and second voltage are equal.

* * * * *